(12) United States Patent
Pearl et al.

(10) Patent No.: US 9,001,980 B2
(45) Date of Patent: Apr. 7, 2015

(54) DATA COMMUNICATION

(71) Applicant: Metaswitch Networks Ltd, Enfield, Middlesex (GB)

(72) Inventors: Philip Pearl, Enfield (GB); Liz Rice, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 13/967,150

(22) Filed: Aug. 14, 2013

(65) Prior Publication Data

US 2013/0329873 A1 Dec. 12, 2013

Related U.S. Application Data

(63) Continuation of application No. PCT/GB2012/050333, filed on Feb. 14, 2012.

(60) Provisional application No. 61/442,772, filed on Feb. 14, 2011.

(30) Foreign Application Priority Data

Mar. 18, 2011 (GB) .................................. 1104616.6

(51) Int. Cl.
*H04M 1/64* (2006.01)
*H04M 7/00* (2006.01)
*H04M 3/42* (2006.01)

(52) U.S. Cl.
CPC ........ *H04M 7/0024* (2013.01); *H04M 3/42059* (2013.01); *H04M 3/42102* (2013.01); *H04M 2203/252* (2013.01)

(58) Field of Classification Search
USPC ............................................ 379/88.17, 88.19
See application file for complete search history.

(56) References Cited

U.S. PATENT DOCUMENTS 7,649,898 B1 1/2010 May, Jr. et al.
2002/0073430 A1 6/2002 Crandall et al.
(Continued)

FOREIGN PATENT DOCUMENTS

GB 2470751 A1 12/2010
WO 2006018696 A1 2/2006
WO 2007003045 A1 1/2007

OTHER PUBLICATIONS

Introduction of CSI Interworking, Huawei, 3GPP TSG-SA Meeting #33, Palm Springs, USA, Sep. 25, 2006.
(Continued)

*Primary Examiner* — Creighton Smith
(74) *Attorney, Agent, or Firm* — EIP US LLP

(57) ABSTRACT

Measures for the communication of data with respect to at least two different user devices in a data communications network. Establishing a communications session for the communication of data to and/or from the at least two different user devices, receiving, on the basis of user input at one of the at least two different user devices, an identifier identifying one or more downloadable resources, generating a transmissible identifier based at least in part on the received identifier, the transmissible identifier being operable to initiate the download of the one or more downloadable resources using the transmissible identifier, and to associate a predetermined identity with the download, and enabling the download of the one or more downloadable resources to another of the at least two different user devices using the transmissible identifier.

23 Claims, 25 Drawing Sheets

(56) References Cited

U.S. PATENT DOCUMENTS

| | | |
|---|---|---|
| 2003/0078036 A1 | 4/2003 | Chang et al. |
| 2005/0068944 A1 | 3/2005 | Schmidt |
| 2005/0138122 A1 | 6/2005 | Boehringer et al. |
| 2008/0037534 A1 | 2/2008 | Shina |
| 2010/0087214 A1 | 4/2010 | Bournel et al. |
| 2010/0111101 A1 | 5/2010 | McKee et al. |
| 2012/0197688 A1* | 8/2012 | Townshend et al. ......... 705/14.1 |
| 2012/0232999 A1* | 9/2012 | Roberts et al. ............. 705/14.66 |

OTHER PUBLICATIONS

Search Report issued in International Application No. PCT/GB2012/050333.

* cited by examiner

DATA COMMUNICATION

CROSS REFERENCE TO PRIOR APPLICATIONS

This application is a continuation of International Application No. PCT/GB2012/050333, filed Feb. 14, 2012 and designating the U.S., which claims priority to Great Britain Patent Application No. GB 1104616.6, filed Mar. 18, 2011, which also claims priority to the U.S. Patent Application No. 61/442,772 filed Feb. 14, 2011 all of which are incorporated herein by reference in their entirety.

TECHNICAL FIELD

The present disclosure relates to the communication of data. In particular, but not exclusively, the present disclosure relates to the communication of data between user devices during telephone calls.

BACKGROUND

Communication between parties in a telecommunications network can be carried out in a number of ways. Most commonly, communication is carried out by a calling party dialing the telephone dialing number of a called party telephony device on a calling party telephony device. The dialing of the telephone number causes a call set-up process to be carried out in the network which results in the telephone of the called party ringing. If the called party chooses to answer their telephone, a telephone call can ensue between the calling party and the called party. The telephone call allows audio data such as speech data to be transferred along an audio channel created between the calling party telephony device and the called party telephony device.

Some telephony devices have enhanced capabilities which allow transfer of video data along a video channel created between the calling party telephone and the called party telephone. A video call may not be possible unless both the calling and called party telephone devices support video call functionality.

Audio or video conferencing may be carried out between three or more remote telephony devices, allowing communication of audio and/or video data between parties to the conference.

Web conferencing is also possible between multiple remote parties using devices with combined data processing, display and telephony capabilities. Web conferencing allows online meetings to be conducted for viewing and/or collaborating on common multimedia content.

Parties may also exchange text data by use of text messaging services such as the Short Message Service (SMS). Enhanced messaging services such as the Multimedia Messaging Service (MMS) allow parties to exchange image and video data in addition to text data.

The example methods of communication described above provide a wide range of ways for remote parties to communicate with each other. However, each method typically has different requirements in terms of device and/or network capability and interchanging between the different methods is either not possible or requires use of inconvenient set-up or configuration processes.

It would therefore be desirable to provide improved methods for communicating data between remote parties, including communication of data in a manner convenient to the parties.

SUMMARY

In accordance with first embodiments, there is a method for the communication of data with respect to at least two different user devices in a data communications network, the method comprising the steps of:

receiving call party details of a telephone call, the telephone call involving at least a first telephony user device and a second telephony user device, the call party details including one or more of a first identity associated with the first telephony user device and a second identity associated with the second telephony user device;

establishing, on the basis of the received call party details, a communications session, separate from the telephone call, for the communication of data to and/or from the at least two different user devices, the communication session being established in response to the telephone call being established;

receiving, on the basis of user input at one of the at least two different user devices, an identifier identifying one or more downloadable resources;

generating a transmissible identifier based at least in part on the received identifier, the transmissible identifier being operable to initiate the download of the one or more downloadable resources using the transmissible identifier, and to associate a predetermined identity with the download; and enabling the download of the one or more downloadable resources to another of the at least two different user devices using the transmissible identifier.

In accordance with second embodiments, there is a method for communication of data with respect to at least two different user devices in a data communications network, the method comprising the steps of:

receiving call party details of a telephone call, the telephone call involving at least a first telephony user device and a second telephony user device, the call party details including one or more of a first identity associated with the first telephony user device and a second identity associated with the second telephony user device;

establishing, on the basis of the received call party details, a communications session, separate from the telephone call, for the communication of data to and/or from the at least two different user devices, the communication session being established in response to the telephone call being established;

generating, from an identifier specified at one of the at least two different user devices, a transmissible identifier identifying one or more downloadable resources, the transmissible identifier being operable to, in response to download of the one or more downloadable resources using the transmissible identifier, associate a predetermined identifier with the download; and enabling the download of the one or more downloadable resources to another of the at least two different user devices using the transmissible identifier.

In accordance with third embodiments, there is server apparatus arranged to perform the method of the first embodiments.

In accordance with fourth embodiments, there is a telephony user device capable of establishing a communications session for communication of data with respect to at least one other user device in a data communications network, the telephony user device being adapted to:

receive call party details of a telephone call, the telephone call involving at least the telephony user device and another telephony user device, the call party details including one or more of a first identity associated with the telephony user device and a second identity associated with the another telephony user device;

establish, on the basis of the received call party details, a communications session, separate from the telephone call, for the communication of data to and/or from the at least one other user device, the communication session being established in response to the telephone call being established;

generate, from an identifier specified at the telephony user device, a transmissible identifier identifying one or more downloadable resources, the transmissible identifier being operable to, in response to download of the one or more downloadable resources using the transmissible identifier, associate a predetermined identifier with the download; and transmit the transmissible identifier via the communications session.

In accordance with fifth embodiments, there is a computer program product comprising a non-transitory computer-readable storage medium having computer readable instructions stored thereon, the computer readable instructions being executable by a computerized device to cause the computerized device to perform the method of the first embodiments.

Further features of embodiments will become apparent from the following description of preferred embodiments, given by way of example only, which is made with reference to the accompanying drawings.

DETAILED DESCRIPTION

Figure 1:
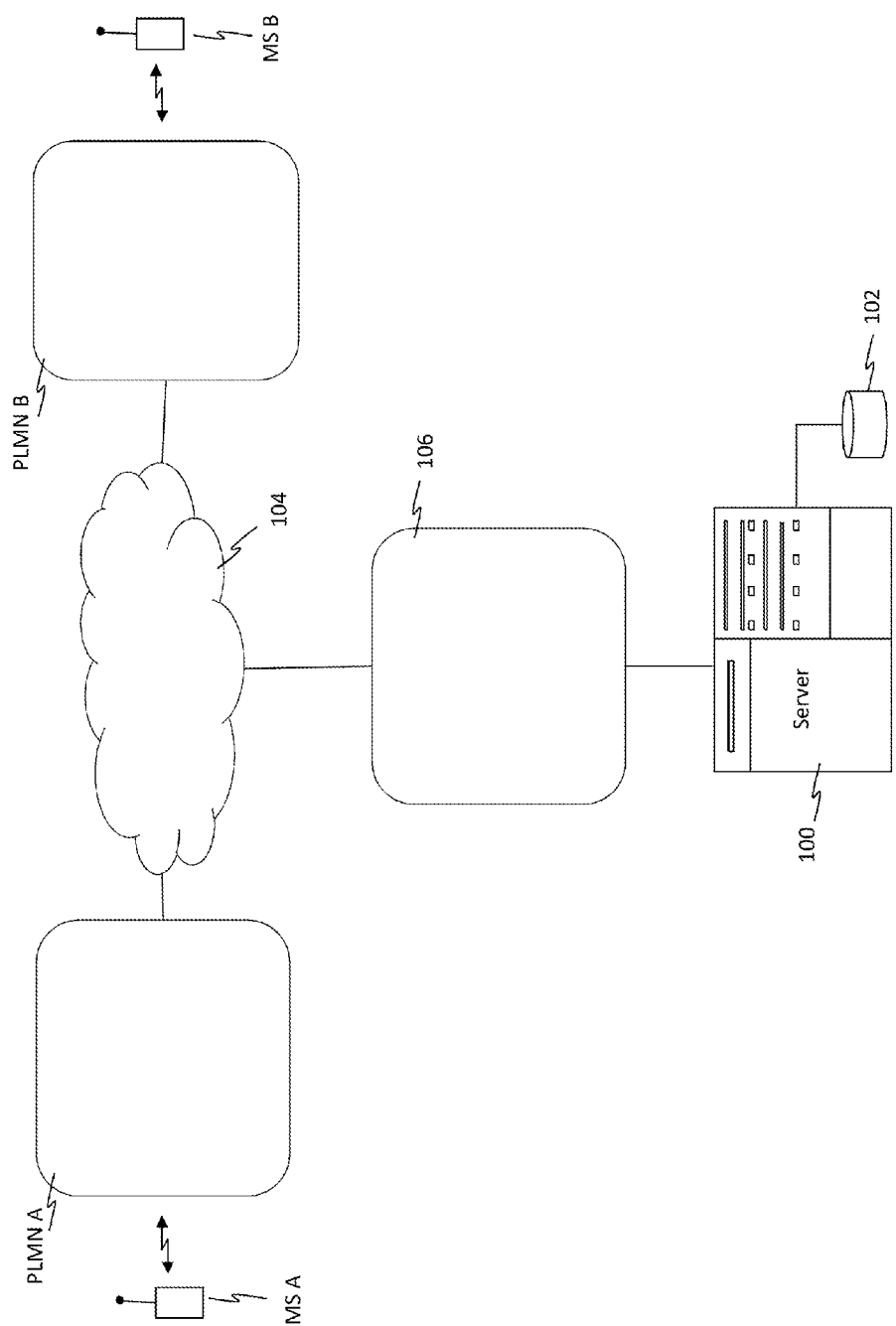
FIG. 1 is a system diagram according to embodiments.

FIG. 1 is a system diagram showing a data communications network according to embodiments. These embodiments involve two mobile stations (MS) MS A and MS B which access public land mobile networks (PLMNs) PLMN A and PLMN B respectively via radio interfaces. MS A and MS B may be smart phones having data processing capabilities and operating systems.

PLMN A and PLMN B contain mobile telephony network infrastructure including one or more mobile switching centers, one or more base station controllers, and one or more base transceiver stations; the function of such entities is well known in the art and will not be described in detail here.

PLMN A and PLMN B are connected via a telecommunications network 104 comprising one or more Public Switched Telephone Networks (PSTNs) and/or packet networks. Telecommunications network 104 comprises one or more media and/or signaling gateway entities (not shown) for performing conversion between the various protocols and data formats used to transfer media and signaling data within and between the different networks. Server 100 has an associated data store 102 and is connected to telecommunications network 104 via a packet network 106.

MS A has an associated identity in the form of a telephone dialing number (TDN), TDN A. MS B has an associated identity in the form of a telephone dialing number TDN B. MS A has communication session application software running on it with an associated application identifier AppID A. MS B also has communication session application software running on it with an associated application identifier AppID B.

In some embodiments, during installation of the application software on MS A, server 100 may be informed of AppID A and creates a record for MS A in data store 102 containing AppID A stored in association with TDN A. Similarly, in some embodiments, during installation of the application software on MS B, server 100 may informed of AppID B and creates a record for MS B in data store 102 containing AppID B stored in association with TDN B.

Figure 2:
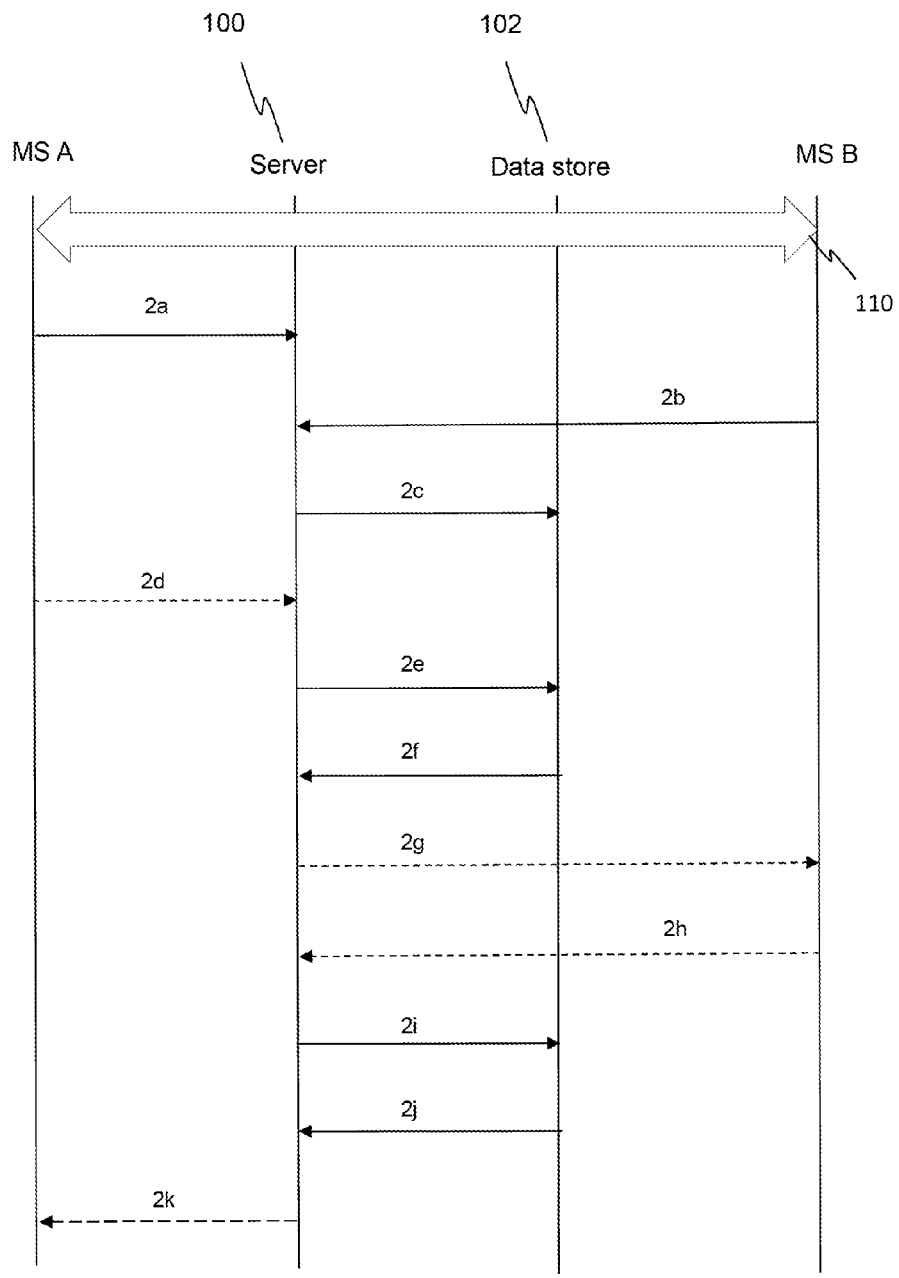
FIG. 2 is a flow diagram depicting operation of embodiments using the system of FIG. 1.

FIG. 2 is a flow diagram depicting operation of embodiments, for example implemented in a system depicted in FIG. 1.

In this and subsequent flow diagrams, solid arrows denote transfer of control, messaging or signaling data, whereas dashed arrows denote transfer of media or payload data.

A voice call is currently in progress between MS A in PLMN A and MS B in PLMN B, as shown by item 110. The voice call will typically be a circuit-switched voice call, the set-up and control for which is known in the art.

Application software running on MS A detects that there is a call in progress between MS A and MS B and notifies server 100 of call party details for the call, e.g. the TDNs of telephones involved in the call, TDN A associated with MS A and TDN B associated with MS B, in step 2a. Similarly, application software running on MS B detects the call in progress between MS B and MS A and notifies server 100 of call party details for the call, e.g. the TDNs of telephones involved in the call, TDN A associated with MS A and TDN B associated with MS B, in step 2b.

Application software running on MS A may detect that the call is in progress by registering with the operating system of MS A to be notified upon start of a call involving MS A. This could for example involve registering with an application programming interface (API) of the operating system of MS A associated with start and end of call events. A similar call detection process may occur on MS B.

In these embodiments, the user of MS A could be the calling or the called party for the call. Call party details are received from both telephony apparatus acting on behalf of the calling party and telephony apparatus acting on behalf of the called party for the call, e.g. telephony device MS A and telephony device MS B.

Server 100 identifies that the notification of step 2*a* from MS A and notification of step 2*b* from MS B have call party details, TDN A and TDN B, in common and establishes a separate communications session, separate from the telephone call, for the communication of data between MS A and MS B. The separate communications session is established on the basis of the received call party details, TDN A and TDN B. The separate communications session is established whilst the telephone call is in progress, and is continued in parallel with the telephone call, such that voice call data is transmitted via the telephone call and other data may be transmitted via the communications session, after the establishment of the separate communications session.

Server 100 updates the records for MS A and MS B in data store 102 to indicate that a call is in progress between MS A and MS B and that a communications session between MS A and MS B, separate to the voice call between MS A and MS B, has been established in step 2*c*.

Server 100 may respond (not shown) to the notifications of steps 2*a* and 2*b* by responding with respective acknowledgements to MS A and MS B.

If MS A wants to communicate data to (e.g. share data with) MS B, it transmits the data to server 100 in step 2*d*. Server 100 performs a lookup in data store 102 using TDN A for MS A in step 2*e* and identifies that a communications session has been established between MS A and MS B. Server 100 retrieves TDN B for MS B in step 2*f* and transmits the data received from MS A to MS B using the retrieved TDN B in step 2*g*.

In embodiments, the lookup in data store 102 of step 2*e* may also result in AppID B being retrieved. The data may then be transmitted to MS B using both TDN B and AppID B, with TDN B being used to locate MS B and AppID B being used to direct the data to the communications session application software running on MS B. The data may be transmitted by means of a push notification directed to AppID B of the communication session application on MS B. In the case of MS B being an Apple® iPhone®, the push notification could employ use of the Apple® Push Notification Service (APNS).

If MS B wants to send data to MS A, it sends the data to server 100 in step 2*h*. Server 100 performs a lookup in data store 102 using TDN B for MS B in step 2*i* and identifies that a communications session has been established between MS B and MS A. Server 100 retrieves TDN A for MS A in step 2*j* and transmits the data received from MS B to MS A using the retrieved TDN A in step 2*k*.

In embodiments, the lookup in data store 102 of step 2*j* may also result in AppID A being retrieved. The data may then be transmitted to MS A using both TDN A and AppID A, with TDN A being used to locate MS A and AppID A being used to direct the data to the communications session application software running on MS A. The data may be transmitted by means of a push notification directed to AppID A of the communication session application on MS A.

In embodiments, the communication session is established in the form of a client-server relationship, with server 100 acting as the server and each of MS A and MS B acting as clients. One connection is created between server 100 and MS A and another connection is created between server 100 and MS B. The two connections together create a channel between MS A and MS B through which data can be communicated in either direction.

In embodiments, server 100 establishes client-server connections with MS A and MS B in response to receiving one or more client-server connection requests.

In embodiments, a client-server connection request is transmitted in response to the telephone call being established between MS A and MS B. In other embodiments, a client-server connection request is transmitted in response to initiation of a data communications service on MS A or MS B after the telephone call is established between them.

Each of the connections could be HyperText Transfer Protocol (HTTP) or HyperText Transfer Protocol Secure (HTTPS) connections.

To avoid loss of the channel between MS and MS B, the connections can be maintained by maintenance messages ('heartbeats') transmitted from server 100 to MS A and MS B, for example transmitted at periodic intervals sufficiently short to prevent time-out of the connections due to inactivity, e.g. a client-server connection can be maintained by transmitting a message to keep the connection alive if the telephone call lasts more than a connection threshold period.

The data communicated via the session may comprise server 100 receiving data identifying a downloadable resource, selected from the group consisting of a photographic image data file; a word processing document data file; a spreadsheet document data file; a presentation document data file; a video image data file; and streaming video, from one of MS A and MS B, during the separate communications session, and transmitting the data to the other of MS A and MS B, for example via the client-server connection.

In embodiments, the communications session between MS A and MS B can be maintained after the voice call is terminated allowing the users of MS A and MS B to continue communicating data between their user devices.

In alternative embodiments, the separate communications session is established via server 100 and data is transmitted via a data communication path between MS A and MS B which is established on the basis of information received from the server, but with server 100 not being including in the data communication path.

Server 100 may receive a service data object from MS A or MS B during the separate communications session and transmit the service data object to the other of MS A and MS B.

Server 100 may receive a service data object from MS A or MS B during the separate communications session, process the service data object in combination with additional service data to generate derived service data; and transmit the derived service data to the other of MS A and MS B.

Figure 3:
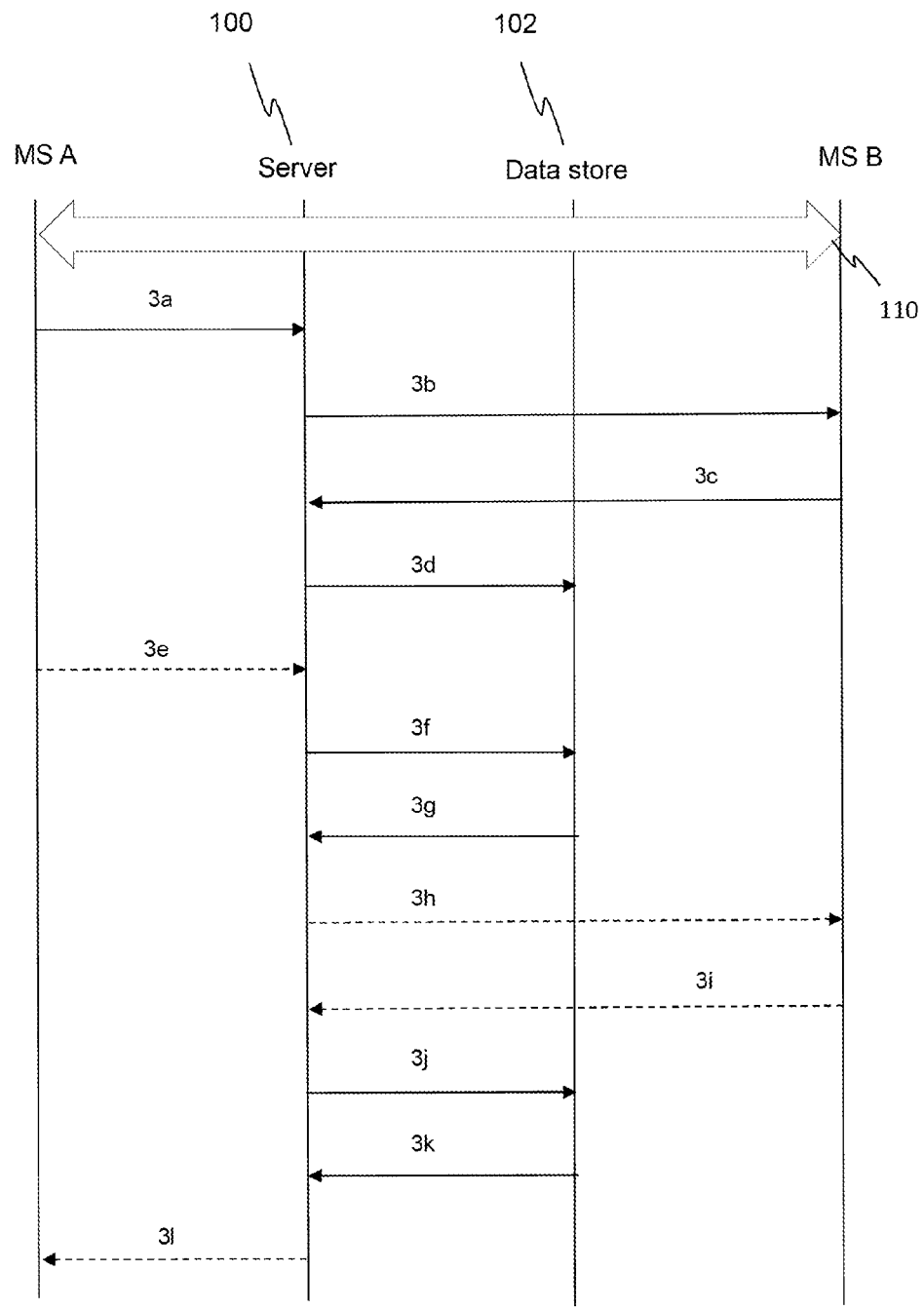
FIG. 3 is a flow diagram depicting operation of embodiments using the system of FIG. 1.

FIG. 3 is a flow diagram depicting operation of embodiments, for example implemented in a system depicted in FIG. 1. Similarly to FIG. 2 described above, a voice call is currently in progress between MS A in PLMN A and MS B in PLMN B, as shown by item 110.

Application software running on MS A detects that there is a call in progress between MS A and MS B and notifies server 100 of call party details for the call, e.g. the TDNs of telephones involved in the call, TDN A associated with MS A and TDN B associated with MS B, in step 3*a*. Here, however, MS B does not have application software or any other capability which can detect the call with MS A and notify server 100 of such. Instead, server 100 notifies MS B of the receipt of call party details for the call from MS A by transmitting a separate communication session initiation request to MS B in step 3*b*. The communication session initiation request may cause a message such as "Do you want to establish a data communication session with the party you are speaking to?" or such like. If the user of MS B accepts the request by appropriate user input, MS B transmits a separate communication session initiation response to server 100 in step 3c indicating that a communication session between MS B and MS A, separate to the voice call, should be established.

In these embodiments, the user of MS A could be the calling or the called party for the call. Call party details are received from either telephony apparatus acting on behalf of the calling party or telephony apparatus acting on behalf of the called party, e.g. MS A.

Once, the response of step 3c is received, server 100 updates the records for MS A and MS B in data store 102 in step 3d to indicate that a call is in progress between MS A and MS B and that a separate communications session between MS A and MS B should be established.

Similarly to FIG. 2 described above, server 100 establishes a separate communications session, separate from the telephone call, for the communication of data between MS A and MS B. The separate communications session is established on the basis of the received call party details, e.g. TDN A and TDN B, whilst the telephone call is in progress, and is continued in parallel with the telephone call, such that voice call data is transmitted via the telephone call and other data can be transmitted via the communications session, after the establishment of the separate communications session.

Communication of data from MS A to MS B can now occur in steps 3e to 3h by a similar process to that described above for steps 2d to 2g in relation to FIG. 2. Further, communication of data from MS B to MS A can now occur in steps 3i to 3l in a similar process to that described above for steps 2h to 2k in relation to FIG. 2.

Figure 4:
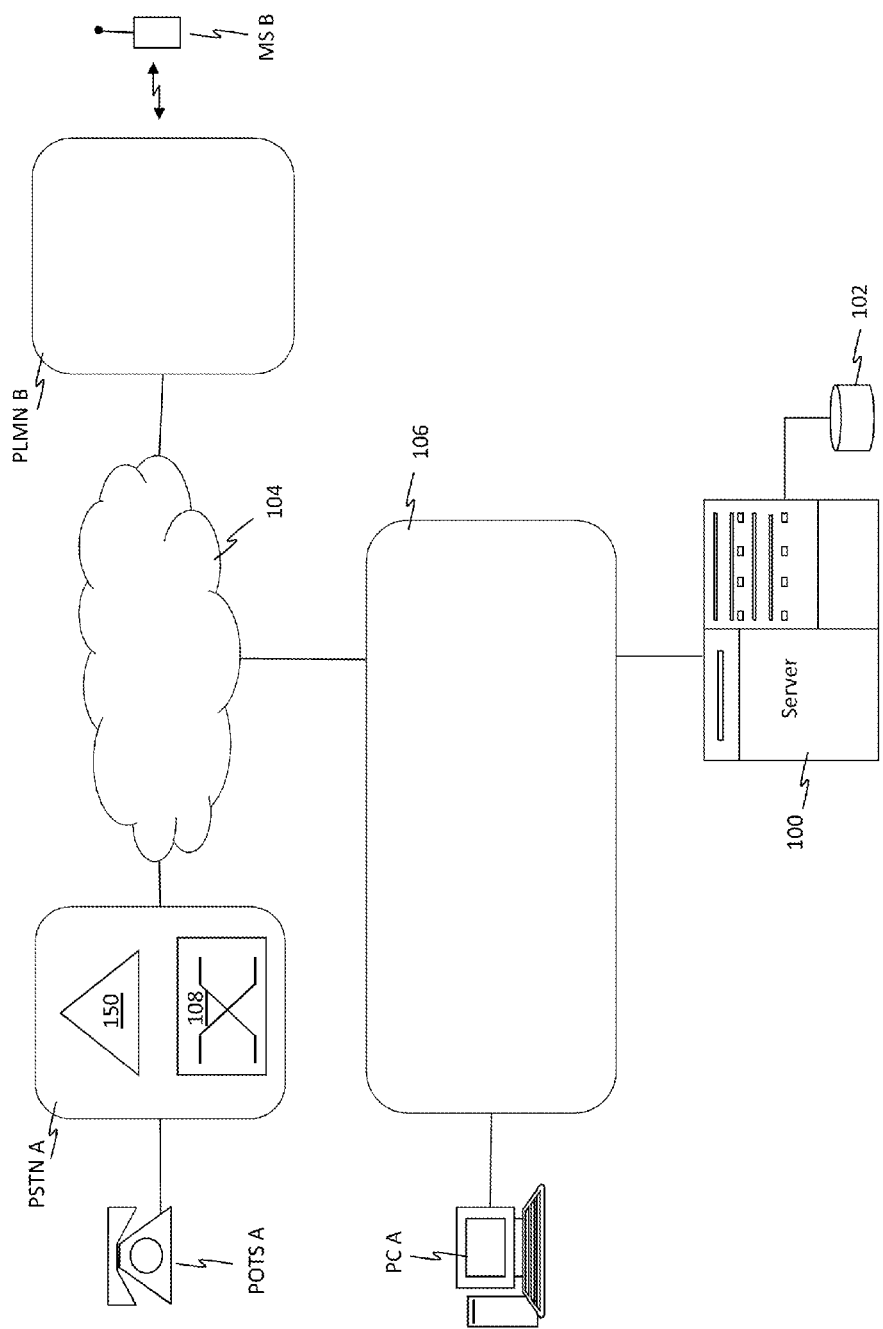
FIG. 4 is a system diagram according to embodiments.

FIG. 4 is a system diagram showing a data communications network according to embodiments. FIG. 4 includes some entities similarly depicted and labeled to FIG. 1, with such entities functioning in a similar manner.

The embodiments of FIG. 4, however, involve an analogue telephone (sometimes referred to as a Plain Old Telephone Service (POTS) telephone or a 'black phone'), denoted POTS A, located in PSTN A, and a mobile station MS B located in PLMN B. PSTN A and PLMN B are connected via a telecommunications network 104 comprising one or more PSTNs and/or packet networks. Further, the user of POTS A also has an associated personal computer PC A connected to packet network 106.

In these embodiments, the user of POTS A cannot conduct communications sessions separate to voice calls conducted via POTS A just using POTS A alone. The user of POTS A therefore additionally employs PC A through which separate communications sessions can be conducted. To provide both voice calls via POTS A and separate communication sessions via PC A, POTS phone and PC A are coupled together logically.

POTS A has an associated telephone dialing number TDN A and MS B has an associated telephone dialing number TDN B. PC A has an associated network address in the form of an Internet Protocol (IP) address IP A in packet network 106. MS B has communications session application software running on it with an associated identifier AppID B.

PSTN A includes a network element 108 in the form of a call switching element, sometimes referred to as a Service Switching Point (SSP), which is capable of detecting whether a query should be raised in relation to calls to/from particular telephone dialing numbers by analyzing in-call signaling information for the calls. Network element 108 acts on behalf of the user of POTS A and PC A and is configured to trigger a query, e.g. hand call control, to a service control point (SCP) network node 150 when it detects a predetermined call state for a call to/from TDN A associated with POTS A, for example by use of an Intelligent Network (IN) or Advanced Intelligent Network (AIN) call origination/termination trigger. SCP 150 is a network node responsible for deciding upon how such queries should be dealt with and acting accordingly, for example responding to network element 108 with appropriate instructions. The query from network element 108 to SCP 150 may pass via one or more Signaling Transfer Points (STPs) (not shown).

Upon receipt of in-call signaling information relating to a query from network element 108, SCP 150 is configured to trigger notification of such to server 100. Any such notification to server 100 will include call party details for the call, e.g. the TDNs of telephones involved in the call, TDN A associated with POTS A and TDN B associated with MS B.

Configuration of SCP 150 may involve storing an IP address for server 100 in association with TDN A, such that when in-call signaling information relating to a call to/from POTS A is received, notification to server 100 at the stored IP address is triggered.

In the embodiments of FIG. 4, POTS A has no communication session application software running on it. Further, POTS A has no capability to generate notifications when a call is outgoing from or incoming to POTS A.

Instead, PC A has communication session application software running on it for facilitating communication sessions according to embodiments.

During installation of the communication session application software on PC A, server 100 is informed that PC A and POTS A are to be coupled together logically. PC A sends IP A and TDN A to server 100 which creates a record for the user of POTS A and PC A in data store 102 containing IP A stored in association with TDN A. Similarly, during installation of the application software on MS B, server 100 is informed of AppID B and creates a record for MS B in data store 102 containing AppID B stored in association with TDN B.

Figure 5:
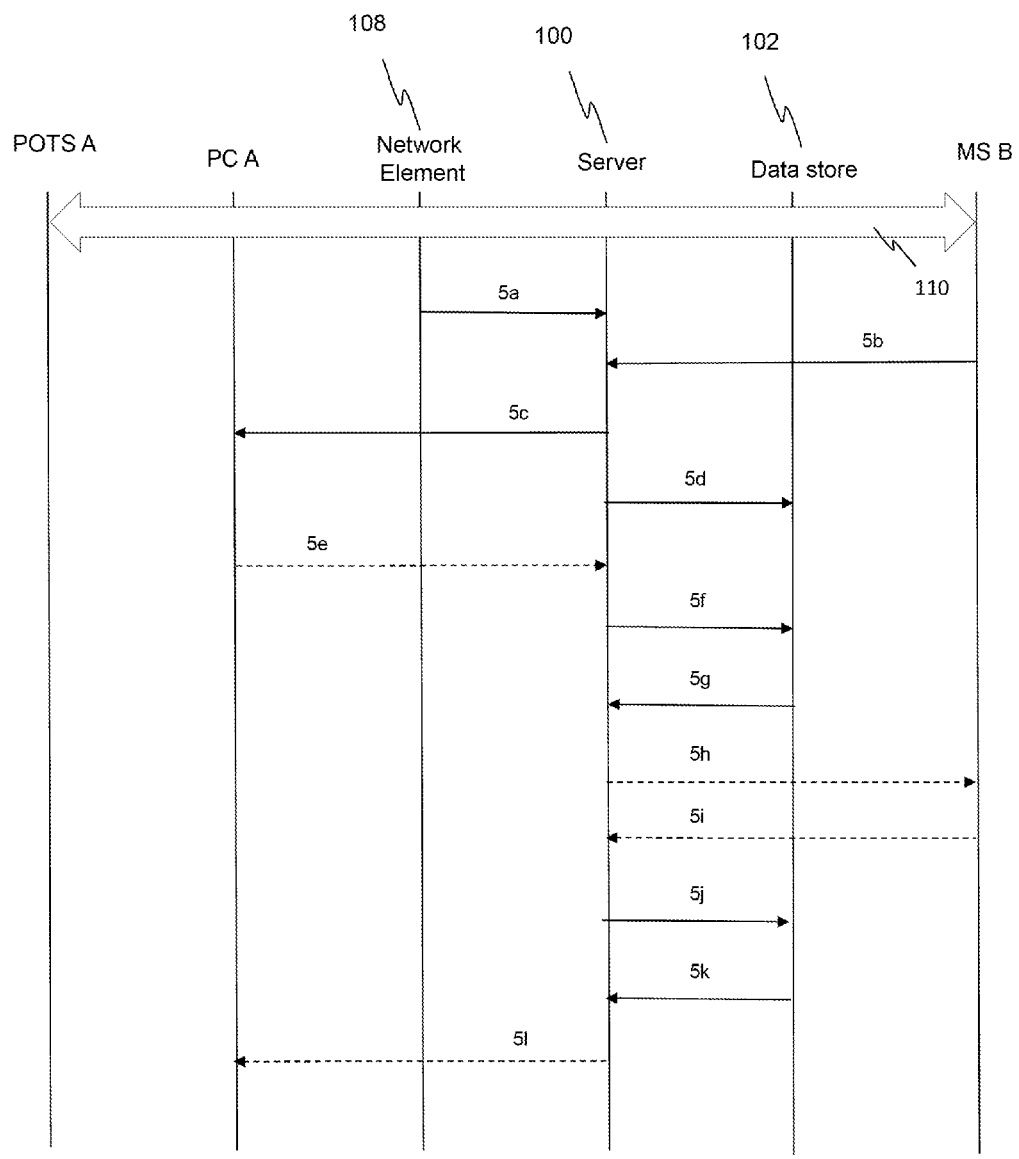
FIG. 5 is a flow diagram depicting operation of embodiments using the system of FIG. 4.

FIG. 5 is a flow diagram depicting operation of embodiments, for example implemented in a system depicted in FIG. 4. Similarly to FIG. 2 described above, a voice call is currently in progress between POTS A in PSTN A and MS B in PLMN B, as shown by item 110.

In the case of an outgoing call being made by POTS A to MS B, network element 108 receives in-call signaling information for the call, including TDN A, for which an AIN call origination trigger is configured. This triggers notification of call party details for the call to server 100 in step 5a.

In the case of an incoming call being received by POTS A from MS B, network element 108 receives in-call signaling information for the call, including TDN, for which an AIN call termination trigger is configured. This triggers notification of call party details for the call to server 100 in step 5a.

A call termination/origination trigger relating to a call to/from POTS A will include call party details for the call, e.g. the TDNs of telephones involved in the call, TDN A associated with POTS A and TDN B associated with MS B.

Application software running on MS B detects the call in progress between MS B and POTS A and notifies server 100 of call party details for the call, e.g. the TDNs of telephones involved in the call, TDN A associated with POTS A and TDN B associated with MS B, in step 5b.

In these embodiments, the user of POTS A could be the calling or the called party for the call. Call party details are received from telephony apparatus acting on behalf of the calling party and telephony apparatus acting on behalf of the called party, e.g. network element 108 and MS B.

Server 100 identifies that the notification of step 5a from network element 108 and the notification of step 5b from MS B have call party details, TDN A and TDN B, in common, e.g. server 100 matches the call party details received on behalf of each respective party to the call.

Server 100 maps the identity TDN A of POTS A to the network address for PC A, e.g. IP A, by reference to data store 102. Alternatively, IP A may be received during the call along with the call party details.

Server 100 establishes a communications session, separate from the telephone call between POTS A and MS B, for the communication of data between PC A and MS B. The separate communications session is established on the basis of the received call party details, e.g. TDN A and TDN B. Once the separate communications session is established, voice call data is transmitted via the telephone call and other data can be transmitted via the separate communications session.

Server 100 notifies PC A via IP A that a call has been detected between POTS A and MS B and that a separate communications session has been established between PC A and MS B in step 5c.

Server 100 updates the records for POTS A/PC A and MS B in data store 102 in step 5d to indicate that a call is in progress between POTS A and MS B and that a separate communications session between PC A and MS B has been established.

If the user of POTS A and PC A wants to communicate data to MS B, the user sends the data using PC A to server 100 in step 5e. Server 100 performs a lookup in data store 102 using IP A for PC A in step 5f and identifies that a communications session has been established between PC A and MS B separately to the call taking place between POTS A and MS B. Server 100 retrieves TDN B for MS B in step 5g and transmits the data received from PC A to MS B using the retrieved TDN B in step 5h.

In embodiments, the lookup in data store 102 of step 5f may also result in AppID B being retrieved. The data may then be transmitted to MS B using both TDN B and AppID B, with TDN B being used to locate MS B and AppID B being used to direct the data to the communications session application software running on MS B.

If the user of MS B wants to send data to the user of POTS A and PC A, the user of MS B sends the data to server 100 in step 5i. Server 100 performs a lookup in data store 102 using TDN A for POTS A in step 5j and identifies that a communications session has been established between PC A and MS B separately to the call taking place between MS B and POTS A. Server 100 retrieves IP A for PC A in step 5k and transmits the data received from MS B to PC A using the retrieved IP A in step 5l.

In alternative embodiments, instead of both call party detail notifications being sent to server 100 in steps 5a and 5b, server 100 may instead notify MS B of the request from PC A to initiate establishment of a separate communications session in a similar manner to step 3b described above in relation to FIG. 3. Similarly to step 3c, MS B will then transmit a communication session initiation response (in response to user input on MS B indicating acceptance of the request) to server 100 indicating that a communication session separate to the voice call between POTS A and MS B should be established between MS B and PC A.

Similarly to embodiments described above in relation to FIG. 2, the communication session is established in the form of a client-server relationship, with server 100 acting as the server and each of PC A and MS B acting as clients. One connection is created between server 100 and PC A and another connection is created between server 100 and MS B.

The two connections together create a channel between PC A and MS B through which data can be communicated in either direction.

In some embodiments, establishing the session comprises receiving a client-server connection request from PC A and establishing a client-server connection with PC A. In other embodiments, establishing the session comprises receiving a client-server connection request from MS B and establishing a client-server connection with MS B.

In embodiments, the client-server connection request is transmitted in response to the telephone call between POTS A and MS B being established. In other embodiments, the client-server connection request is transmitted in response to initiation of a data communications service on PC A after the telephone call between POTS A and MS B is established.

If the call between POTS A and MS B is terminated at any stage and server 100 receives an indication of such, a notification message may be transmitted to PC A to inform it of a change of state of the separate communication session.

In alternative embodiments, network element 108 is a call initiating element, for example configured to initiate the establishment of the telephone call between POTS A and MS B in response to a remote click-to-dial website action by a user.

Figure 6:
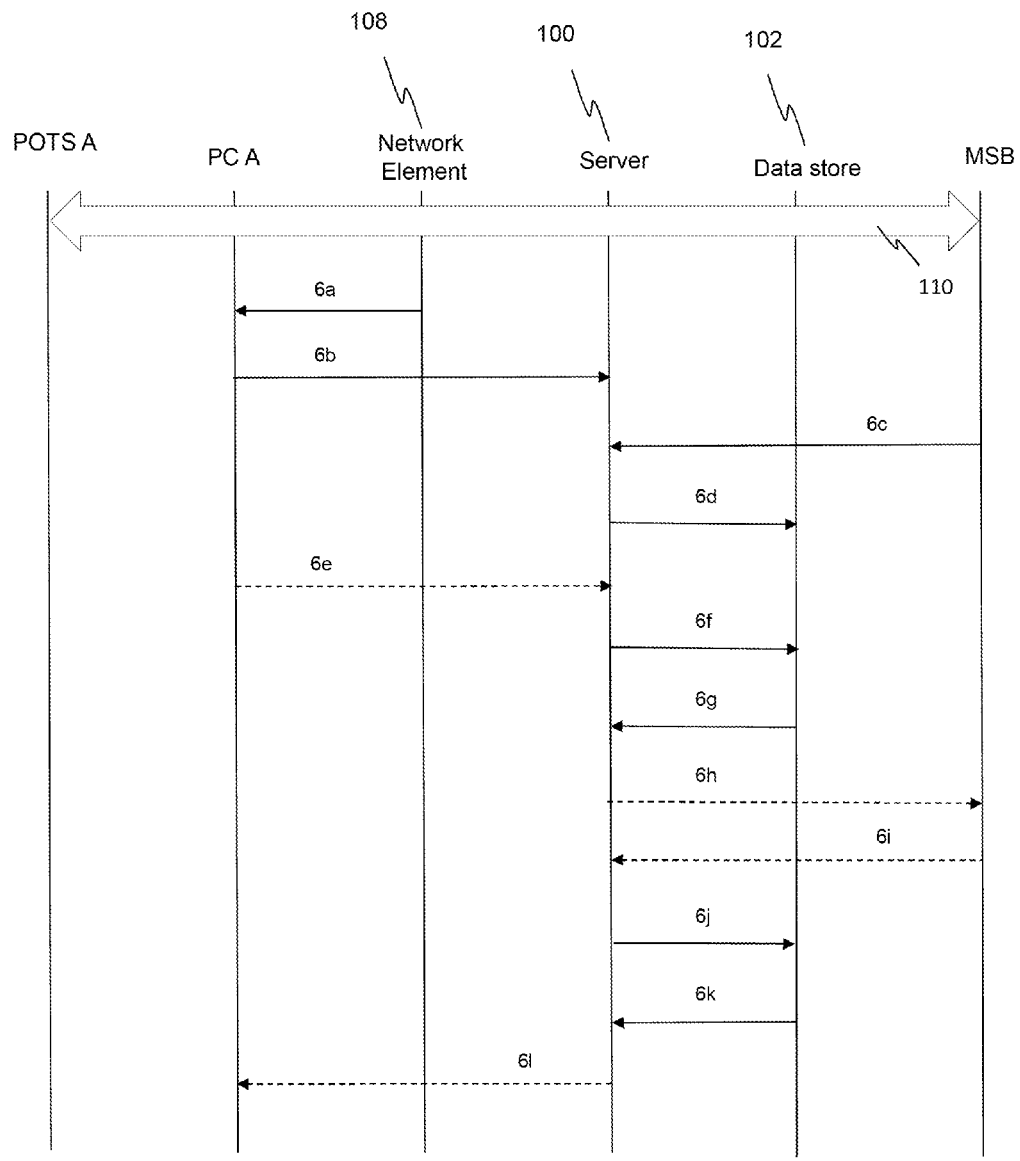
FIG. 6 is a flow diagram depicting operation of embodiments using the system of FIG. 4.

FIG. 6 is a flow diagram depicting operation of embodiments, for example implemented in a system depicted in FIG. 4. Network element 108 is configured similarly to network element 108 described above in relation to FIG. 4, e.g. when it detects a call to/from TDN A associated with POTS A, for example by use of an Advanced Intelligent Network (AIN) call origination/termination trigger, a query to SCP 150 is triggered. Here, however, SCP is configured such that upon receipt of in-call signaling information relating to a query from network element 108, notification to PC A is triggered, instead of notification to server 100. Any such notification to PC A will include call party details for the call, e.g. the TDNs of telephones involved in the call, TDN A associated with POTS A and TDN B associated with MS B.

Configuration of SCP 150 may involve storing an IP address IP A for PC A in association with TDN A, such that when a call is received to/from POTS A, PC A can be notified at the stored IP address.

In the embodiments of FIG. 6, when network element 108 detects the call being conducted between POTS A and MS B, it transmits call party details for the call, TDN A and TDN B, to PC A in step 6a. PC A forwards the call party details notification, including TDN A and TDN B, to server 100 in step 6b.

Application software running on MS B detects the call in progress between MS B and POTS A and notifies server 100 of call party details for the call, e.g. the TDNs of telephones involved in the call, TDN A associated with POTS A and TDN B associated with MS B, in step 6c.

In these embodiments, the user of POTS A could be the calling or the called party for the call. Call party details are received from telephony apparatus acting on behalf of the calling party and telephony apparatus acting on behalf of the called party, e.g. PC A and MS B.

Steps 6d to 6l of FIG. 6 then proceed in a similar manner to steps 5d to 5l described above in relation to FIG. 5.

Figure 7:
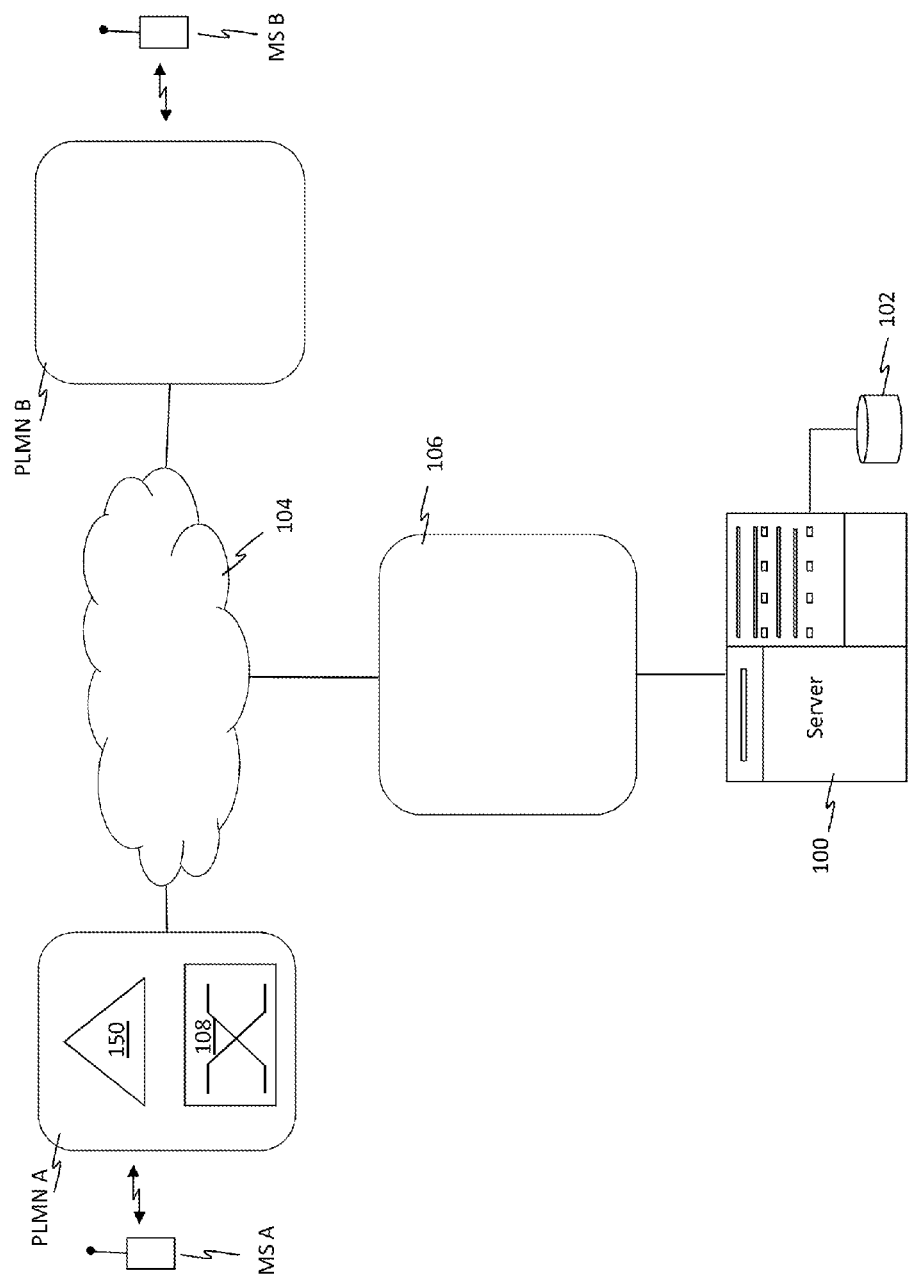
FIG. 7 is a system diagram according to embodiments.

FIG. 7 is a system diagram showing a data communications network according to embodiments. FIG. 7 includes some elements similarly depicted and labeled to FIG. 4, with such elements functioning in a similar manner.

In the embodiments of FIG. 7, MS A has communication session application software running on it with an associated identifier AppID A. However, MS A does not have application software (or any other capability) for detecting calls to/from MS A and notifying server 100 of such.

MS B has communication session application software running on it with an associated identifier AppID B. In addition, MS B has application software running on it which is capable of detecting calls to/from MS B and notifying server 100 of such.

During installation of the communication session application software on MS A, server 100 is informed of AppID A and creates a record for MS A in data store 102 containing AppID A stored in association with TDN A. Similarly, during installation of the communication session application software on MS B, server 100 is informed of AppID B and creates a record for MS B in data store 102 containing AppID B stored in association with TDN B.

PLMN A includes a network switching element 108, for example an SSP, capable of generating queries in response to triggers configured for calls to/from MS A. Network element 108 of FIG. 7 generates queries to SCP 150 in a similar manner to network element 108 described above in relation to FIG. 4. The network element 108 of FIG. 4 generates queries in relation to wireline network triggers, for example Advanced Intelligent Network (AIN) triggers, generated within PSTN of FIG. 4. In FIG. 7, however, the queries are generated in relation to wireless network triggers such as Customized Applications for Mobile networks Enhanced Logic (CAMEL) or Wireless Intelligent Network (WIN) triggers.

Network switching element 108 is configured to trigger a query including in-call signaling information to a service control point (SCP) network node 150 when it detects a call to/from TDN A associated with MS A. Upon receipt of in-call signaling information relating to a query from network element 108, SCP 150 is configured to trigger notification of such to server 100. Any such notification to server 100 will include call party details for the call, e.g. the TDNs of telephones involved in the call, TDN A associated with POTS A and TDN B associated with MS B.

Configuration of SCP 150 may involve SCP 150 storing an IP address for server 100 in association with TDN A, such that when in-call signaling information relating to a call to/from POTS A is received, notification to server 100 at the stored IP address is triggered.

Figure 8:
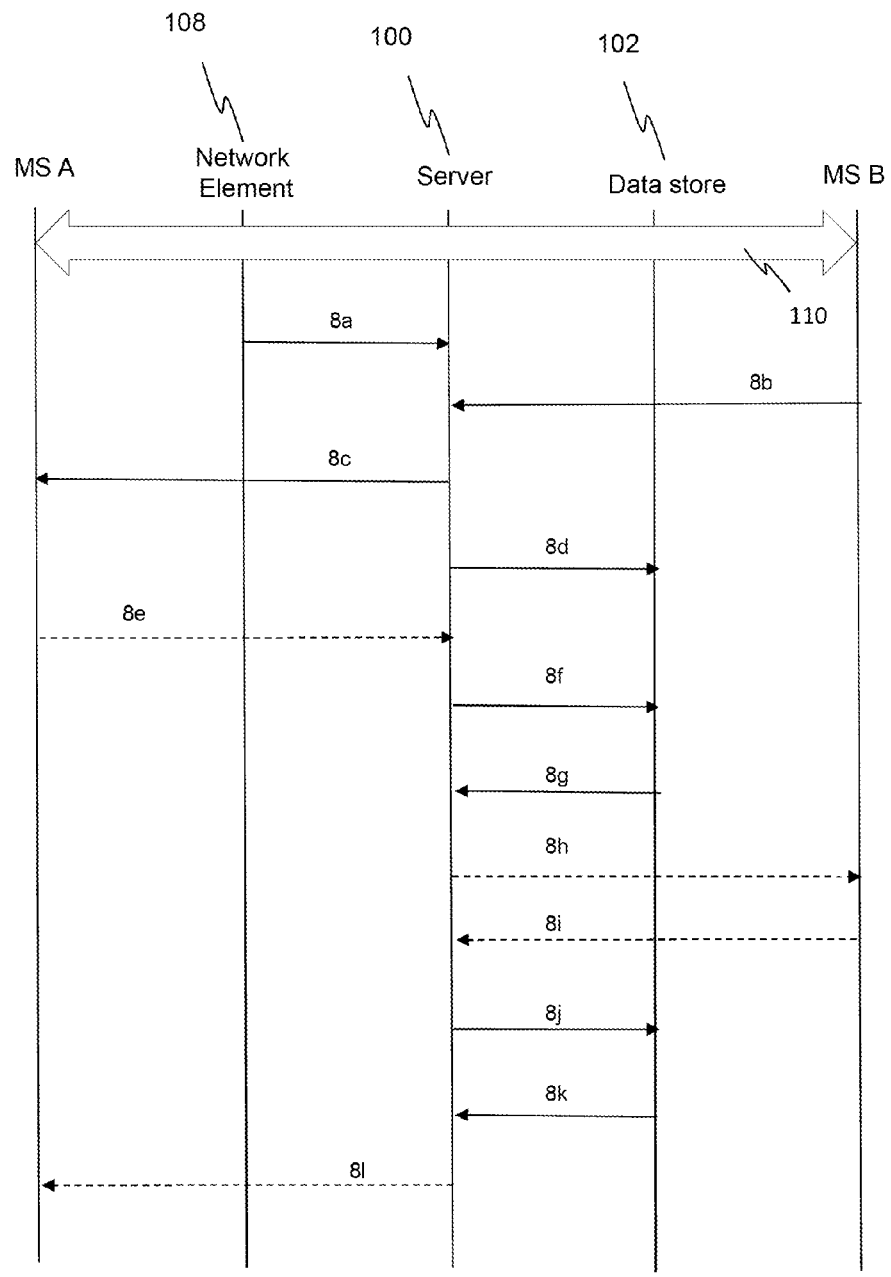
FIG. 8 is a flow diagram depicting operation of embodiments using the system of FIG. 7.

FIG. 8 is a flow diagram depicting operation of embodiments, for example implemented in a system depicted in FIG. 7. Similarly to FIG. 2 described above, a voice call is currently in progress between MS A in PLMN A and MS B in PLMN B, as shown by item 110.

In the case of an outgoing call being made by MS A to MS B, network element 108 receives in-call signaling information for the call, including TDN A, for which a wireless call origination trigger is configured. This triggers notification of call party details for the call to server 100 in step 8*a*.

In the case of an incoming call being received by MS A from MS B, network element 108 receives in-call signaling information for the call, including TDN A, for which a wireless call termination trigger is configured. This triggers notification of call party details for the call to server 100 in step 8*a*.

A call termination/origination trigger relating to a call to/from MS A will include call party details for the call, e.g. the TDNs of telephones involved in the call, TDN A associated with MS A and TDN B associated with MS B.

Application software running on MS B detects the call in progress between MS B and MS A and notifies server 100 of call party details for the call, e.g. the TDNs of telephones involved in the call, TDN A associated with MS A and TDN B associated with MS B, in step 8*b*.

In these embodiments, the user of POTS A could be the calling or the called party for the call. Call party details are received from telephony apparatus acting on behalf of the calling party and telephony apparatus acting on behalf of the called party, e.g. network element 108 and MS B.

Server 100 identifies that the notification of step 8*a* from network element 108 and the notification of step 8*b* from MS B have call party details, TDN A and TDN B, in common and establishes a communications session, separate from the telephone call between MS A and MS B, for the communication of data between MS A and MS B. The separate communications session is established on the basis of the received call party details, e.g. TDN A and TDN B. Once the separate communications session is established, voice call data is transmitted via the telephone call and other data can be transmitted via the separate communications session.

Server 100 notifies MS A that a call has been detected between MS A and MS B and that a separate communications session has been established between MS A and MS B in step 8*c*.

Server 100 updates the records for MS A and MS B in data store 102 in step 8*d* to indicate that a call is in progress between MS A and MS B and that a separate communications session between MS A and MS B has been established.

Communication of data from MS A to MS B can now occur in steps 8*e* to 8*h* by a similar process to that described above for steps 2*d* to 2*g* in relation to FIG. 2. Further, communication of data from MS B to MS A can now occur in steps 8*i* to 8*l* in a similar process to that described above for steps 2*h* to 2*k* in relation to FIG. 2.

In alternative embodiments, instead of both call party detail notifications being sent to server 100 in steps 8*a* and 8*b*, server 100 may instead notify MS B of the request from MS A to initiate establishment of a separate communications session in a similar manner to step 3*b* described above in relation to FIG. 3. Similarly to step 3*c*, MS B will then transmit a communication session initiation response (in response to user input on MS B indicating acceptance of the request) to server 100 indicating that a communication session separate to the voice call between MS A and MS B should be established between MS B and MS A.

Figure 9:
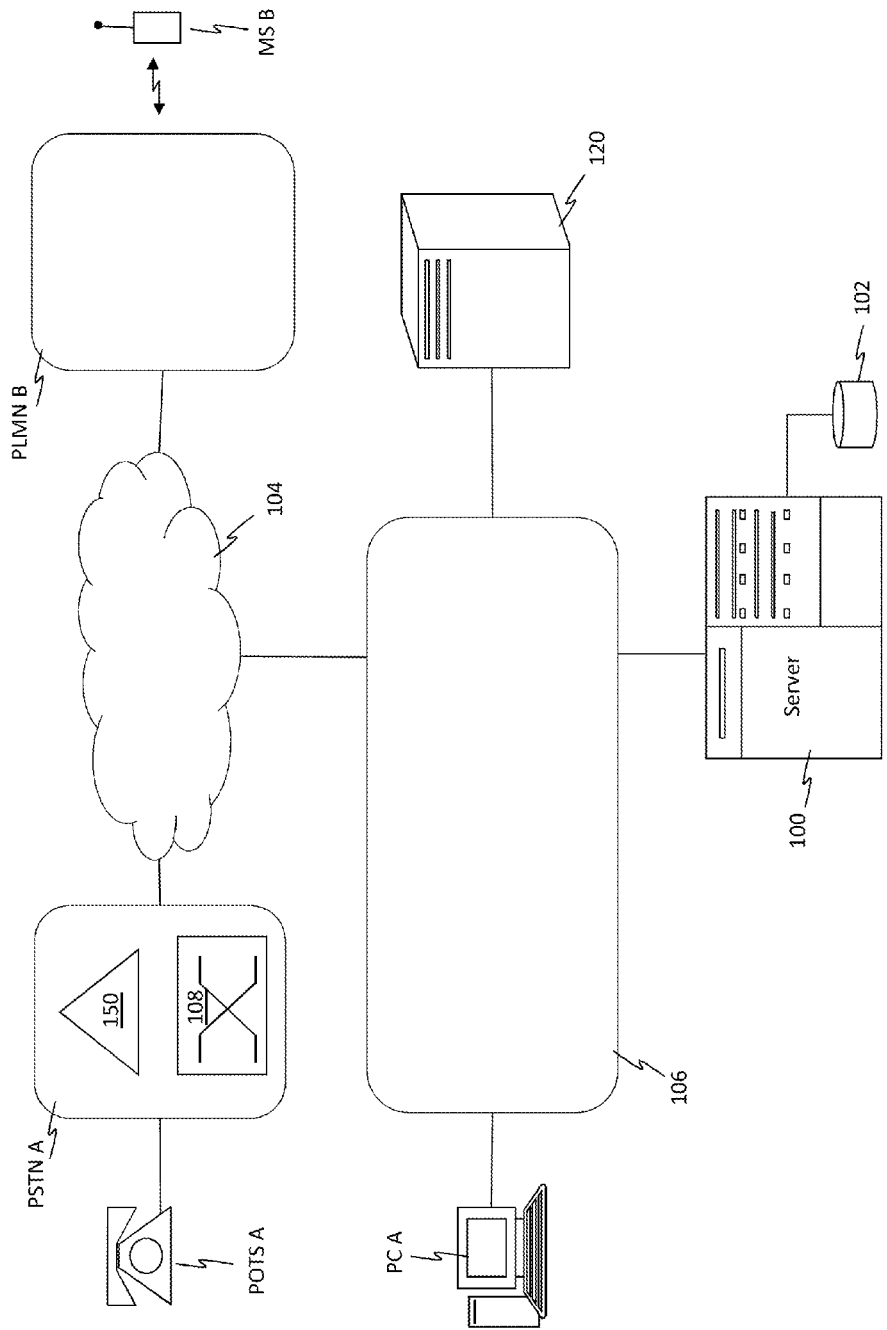
FIG. 9 is a system diagram according to embodiments.

FIG. 9 is a system diagram showing a data communications network according to embodiments. FIG. 9 includes some entities similarly depicted and labeled to FIG. 4, with such entities functioning in a similar manner. In addition, the system of FIG. 9 includes a content server 120 connected to packet network 106 at which electronic content can be provided, for example via electronic download. The electronic content could comprise software components such as applications or plug-ins, or media data such as music, videos, computer games, etc.

Figure 10:
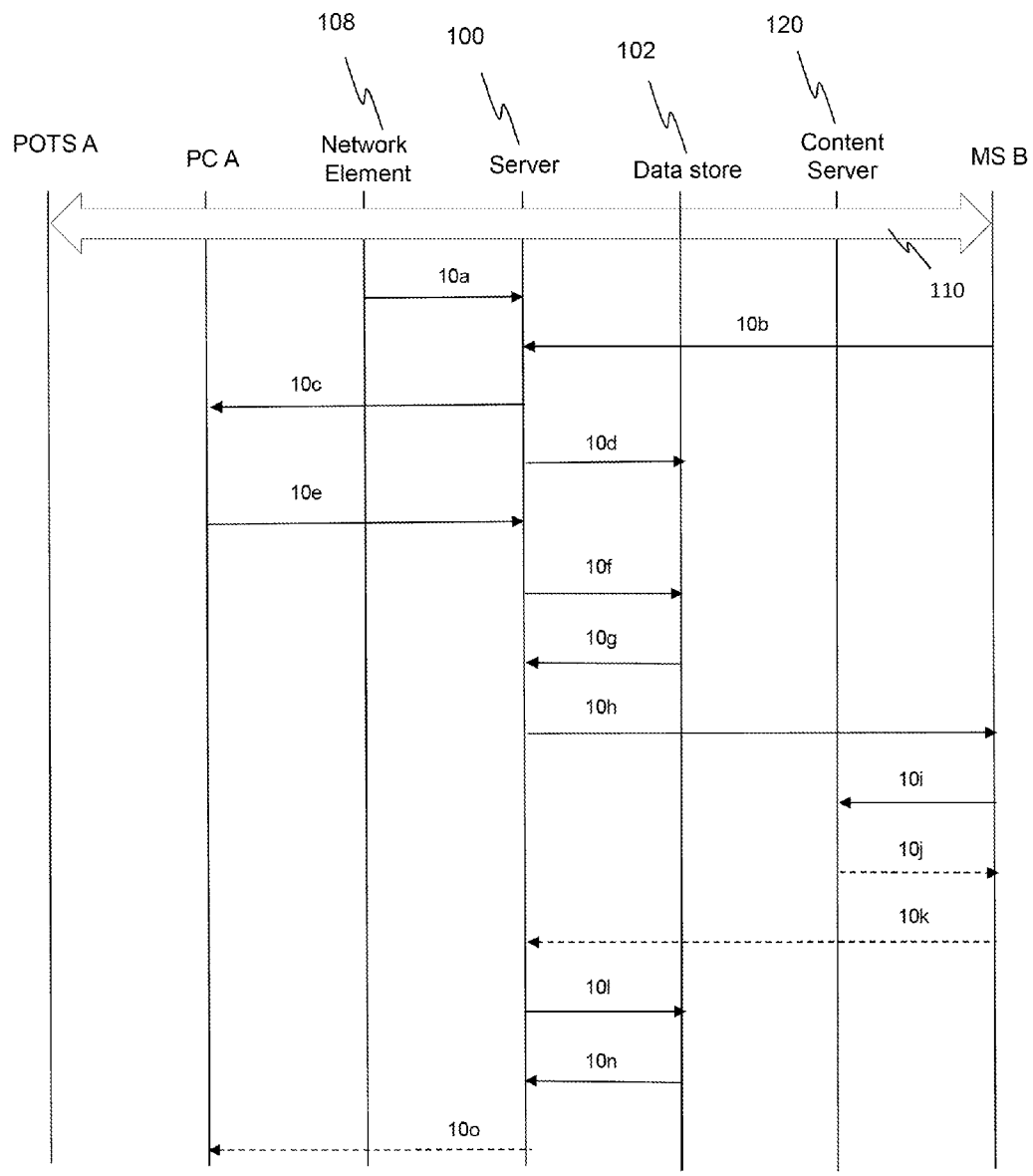
FIG. 10 is a flow diagram depicting operation of embodiments using the system of FIG. 9.

FIG. 10 is a flow diagram depicting operation of embodiments, for example implemented in a system depicted in FIG. 9. Similarly to FIG. 5 described above, a voice call is currently in progress between POTS A in PSTN A and MS B in PLMN B, as shown by item 110.

Similarly to steps 5*a* to 5*d* described above in relation to FIG. 5, steps 10*a* to 10*d* of FIG. 10 depict detection of a voice call between POTS A and MS B by network element 108 and notification of such to server 100, detection of the call between POTS A and MS B by MS B and notification of such to server 100, establishment of a separate communications session between PC A and MS B and notification of such to PC A, and updating of data store 102.

In these embodiments, the user of POTS A and PC A wishes to use a software component in the separate communications session with MS B and transmits from PC A an identifier for the software component, for example an application name, file name or Uniform Resource Locator (URL), to server 100 in step 10*e*. The software component may for example comprise a plug-in relating to the communications session application software installed on MS B and PC A.

Server 100 performs a lookup in data store 102 using IP A for PC A in step 10*f* and identifies that a communications session, separate to the voice call between POTS A and MS B, has been established between PC A and MS B. Server 100 retrieves TDN B for MS B in step 10*g* and proceeds to enable download of the software component by MS B.

Server 100 enables the download by transmitting the identifier for the software component received from PC A to MS B in step 10*h*. The identifier could be transmitted to MS B embedded in a text message such as an SMS message.

Using the received software component identifier, MS B sends a download request for the software component to content server 120 in step 10*i*. Content server then provides the software component to MS B in step 10*j*.

If the user of MS B wants to communicate data relating to use of the software component to the user of POTS A and PC A, MS B transmits such data to server 100 in step 10*k*. When server 100 receives the data from MS B in step 10*k* it performs a lookup in data store 102 using TDN B for MS B in step 10*l* and identifies that a separate communications session has been established between PC A and MS B. Server 100 retrieves IP A for PC A in step 10*n* and transmits the data received from MS B to PC A in step 10*o*. Data may be communicated from PC A to MS B in a similar manner as per steps 2*h* to 2*k* described above in relation to FIG. 2.

When server 100 receives the software component identifier in step 10*e*, it may identify that further information is required for downloading the software component, for example if only an application name is supplied by PC A. The further information could include an IP address, domain name or URL for locating content server 120 in packet network 106; such further information may be stored locally to server 100 or could be obtained via a search or query process carried out by server 100 within packet network 106 or beyond. In such a case, server 100 will additionally provide such further information to MS B in step 10*h*.

In alternative embodiments, when server 100 receives the software component identifier in step 10*e*, it performs a lookup in data store 102 and identifies that that a separate communications session has been established between PC A and MS B. Server 100 then downloads the software component from content server 120 itself using the software component identifier received from PC A, and transmits the software component directly to MS B.

In further alternative embodiments, instead of PC A transmitting an identifier for the software component to server 100 as per step 10*e*, PC A transmits the software component itself to server 100. Server 100 performs a lookup in data store 102 and identifies that that a separate communications session has been established between PC A and MS B and transmits the software component received from PC A to MS B.

In embodiments, before download of the software component to MS B or PC A is enabled, a capability check is conducted to determine whether MS B or PC A is initially enabled with the software component. If the capability check indicates that the respective user device is not initially enabled with the software component, then enabling of the download may proceed.

In some embodiments, capability data for one or more user devices is stored in data store 102 and server 100 may carry out a capability check by reference to data store 102. In other embodiments, the capability check involves transmitting a capability query to a user device, and receiving a response indicating whether the device is initially enabled with the software component.

In embodiments, the separate communications session is established using a session establishment software application or operating system function on the user device to which the software component is being downloaded to and the software component is a software application which interoperates with the session establishment software application or operating system function.

In embodiments, a client-server connection request is transmitted by the user device to which the software component is being downloaded to server 100 and a client-server connection is established between server 100 and that device. The software component is transmitted via the established client-server connection. The client-server connection request could be transmitted in response to the telephone call being established or in response to a notification received during the telephone call, after the telephone call is established.

Figure 11:
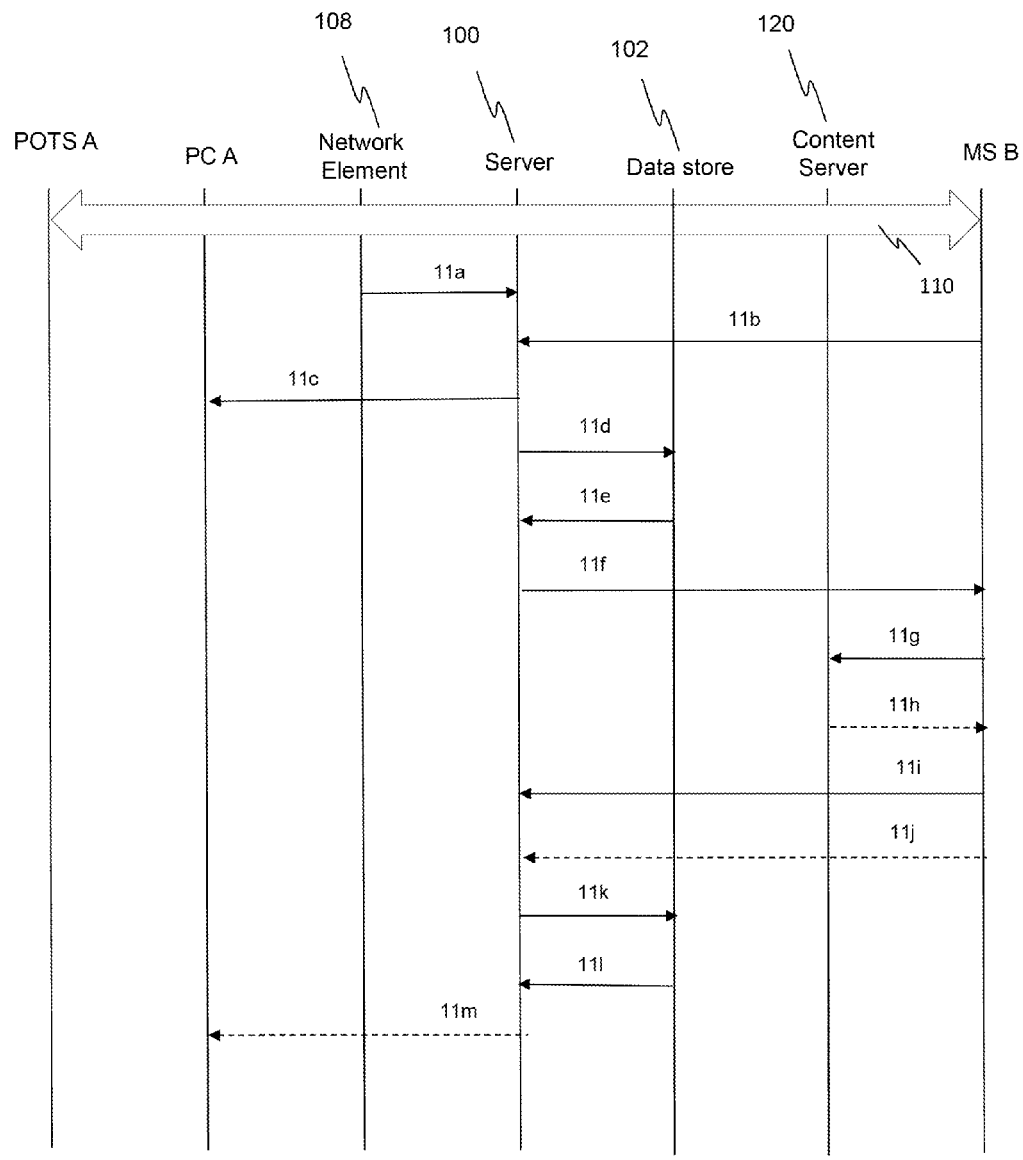
FIG. 11 is a flow diagram depicting operation of embodiments using the system of FIG. 9.

FIG. 11 is a flow diagram depicting operation of embodiments, for example implemented in a system depicted in FIG. 9. Similarly to FIG. 10 described above, a voice call is currently in progress between POTS A in PSTN A and MS B in PLMN B, as shown by item 110.

Steps 11*a* to 11*c* of FIG. 11 depict detection of a voice call between POTS A and MS B by network element 108 and notification of call party details for such to server 100, detection of the call between POTS A and MS B by MS B and notification of call party details for such to server 100, as well as notification of the detected call to PC A.

When server 100 receives the call party details for the call between POTS A and MS B in steps 11*a* and 11*b*, it performs a lookup in data store 102 for the TDNs of MS A and MS B in step 11*d*. From the lookup information received in step 11*e*, server 100 identifies that MS B is an initially non-enabled user device that does not currently have a capability associated with participating in a communication session separate to the voice call between POTS A and MS B.

For example, a data record for MS B in data store 102 may indicate that MS B does not have communications session software installed on it, or there may be no data record at all for MS B in data store 102 which also indicates that MS B does not have communications session software installed on it.

In these embodiments, in order to provide the initially non-enabled user device MS B with the capability associated with participating in the session, server 100 enables the download of a software application to the initially non-enabled user device MS B.

Server 100 enables the download of the software application by transmitting an identifier for the software application to MS B in step 11*f*. The identifier could be transmitted to MS B embedded in a text message such as an SMS message.

Using the received software application identifier, MS B sends a download request for the software application to content server 120 in step 11*g*. Content server then provides the software application to MS B in step 11*h*.

MS B proceeds to install the software application, which when installed, sends an installation confirmation message to server 100 in step 11*i*. Server 100 is now able to establish a communications session between PC A and MS B which is separate to the voice call being conducted between POTS A and MS B.

Once the separate communications session between MS B and PC A is established, MS B may communicate data to PC A as shown in steps 11j to 11m in a similar manner to steps 5i to 5l as described above in relation to FIG. 5. Further, communication of data from MS B to MS A can now occur (not shown) in a similar process to that described above for steps 5e to 5h in relation to FIG. 5.

In embodiments, establishment of the separate communications session may be initiated by the user of POTS A and PC A, for example by user input on PC A. The user input causes communications session software installed on PC A to transmit a communications session initiation request message to server 100 which then proceeds to establish a separate communications session as described above.

Figure 12:
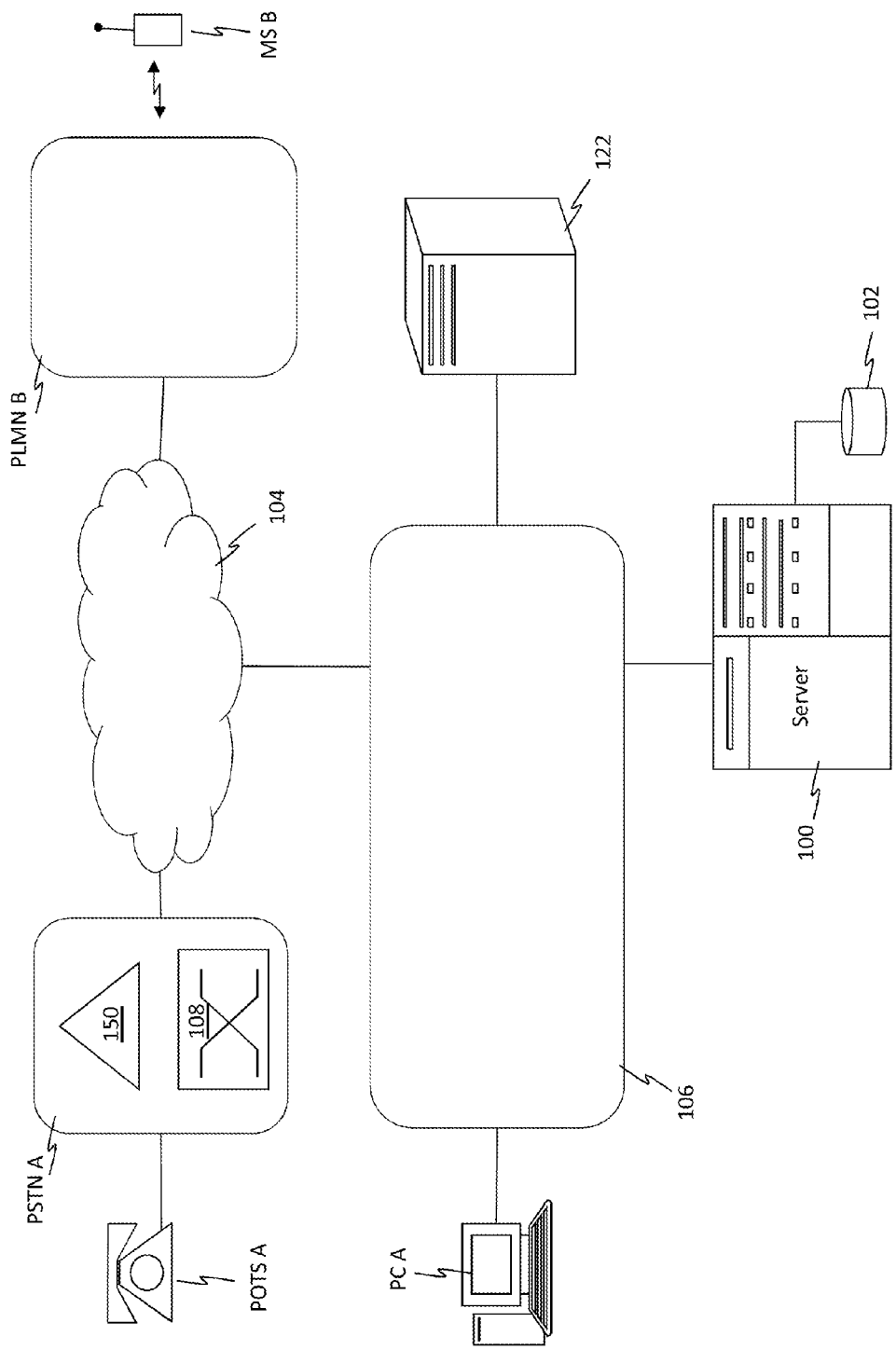
FIG. 12 is a system diagram according to embodiments.

FIG. 12 is a system diagram showing a data communications network according to embodiments. FIG. 12 includes some entities similarly depicted and labeled to FIG. 4, with such entities functioning in a similar manner. In addition, the system of FIG. 12 includes an authorization server 122 connected to packet network 106 at which authorization for use of copyrighted electronic content can be requested and granted. The electronic content could comprise software components such as applications and plug-ins, or media data such as music, videos, etc.

Figure 13:
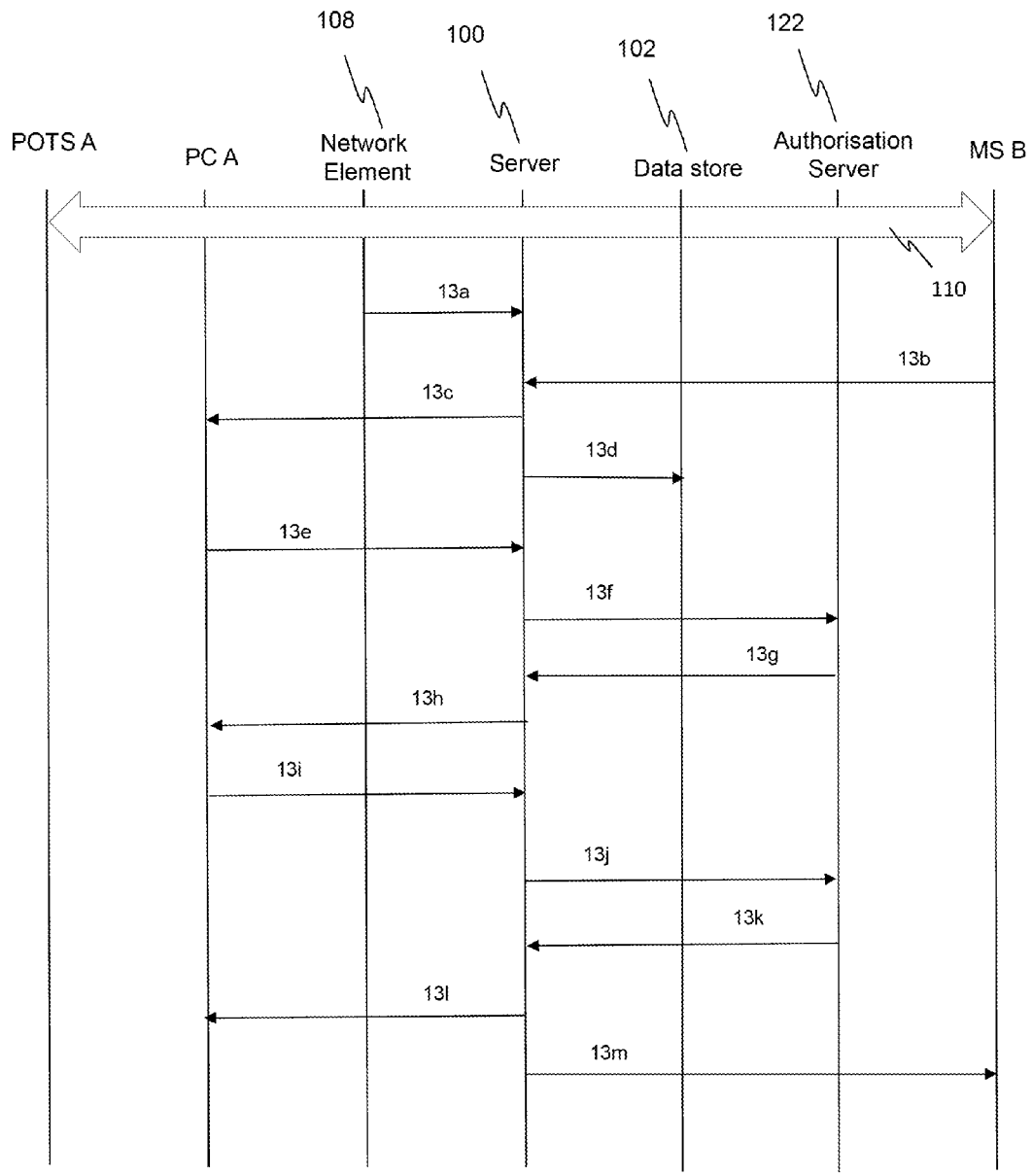
FIG. 13 is a flow diagram depicting operation of embodiments using the system of FIG. 12.

FIG. 13 is a flow diagram depicting operation of embodiments, for example implemented in a system depicted in FIG. 12. Similarly to FIG. 5 described above, a voice call is currently in progress between POTS A in PSTN A and MS B in PLMN B, as shown by item 110.

Similarly to steps 5a to 5d described above in relation to FIG. 5, steps 13a to 13d of FIG. 13 depict detection of a voice call between POTS A and MS B by network element 108 and notification of call party details for such to server 100, detection of the call between POTS A and MS B by MS B and notification of such to server 100, establishment of a separate communications session between PC A and MS B and notification of such to PC A, and updating of data store 102 accordingly.

In these embodiments, the user of POTS A and PC A, transmits from PC A an identifier identifying a feature of the communications session separate to the voice call between POTS A and MS B that requires authorization for use by MS B in step 13e. The feature could for example be a software component or media data and the identifier could be a URL or other network address at which the feature can be located.

Upon receipt of the feature identifier, server 100 transmits an authorization requirement query containing the feature identifier to authorization server 122 in step 13f. The authorization requirement query has the effect of asking the authorization server whether authorization for use of the identified feature by MS B in the separate communications session is required. Authorization server 122 performs any appropriate checks, for example with reference to a copyright records database (not shown), and transmits an authorization requirement response back to server 100 in step 13g. In this case, the authorization requirement response of step 13g indicates that authorization for use of the identified feature by MS B is required, for example "A copyright fee of $xx must be paid" for use of the identified feature in the separate communications session.

Server 100 now requests authorization from the user of PC A and POTS A to authorize the use of the identified feature by MS B in the separate communications session in step 13h, for example asking the user of POTS A and PC A whether they are willing to accept the $xx copyright charge. The user of POTS A and PC A accepts the charge by appropriate input via PC A which results in an indication of authorization being transmitted from PC A to server 100 in step 13i.

When server 100 receives the authorization indication of step 13i from PC A, server 100 enables the use of the feature by MS B in the separate communications session. Server 100 contacts authorization server 122 in step 13j requesting that authorization for the identified feature be granted. Server 122 responds to server 100 with an authorization grant in step 13k.

Granting authorization may involve authorization server contacting a payment server of an appropriate financial institution on behalf of the user device in question, for example to pay a copyright fee for use of the feature. The charge will generally be passed on to a an account associated with the user of POTS A and PC A because it is that user who is requesting use of the identified feature by the user of MS B in the separate communications session.

The user of PC A is informed that authorization of the feature has been granted by a message transmitted from server 100 to PC A in step 13l, for example including confirmation of the amount charged to their account.

Server 100 enables use of the feature for MS B by transmitting an identifier for the feature along with an authorization token proving that use of the feature by MS B has been authorized. The user of MS B can then download (not shown) or otherwise access the feature using the feature identifier and authorization token received from server 100 without having to request authorization (or pay for such). Download of the feature may involve contacting a content server such as item 120 in FIG. 9.

The authorization token may include a purchase token proving that a copyright fee or suchlike has already been paid for use of the feature.

In some embodiments, the feature may involve using a service application which requires authorization in order to process service data transmitted during the separate communications session. In alternative embodiments, the feature may involve accessing data which requires authorization in relation to which an identifier is transmitted during the separate communications session.

Figure 14:
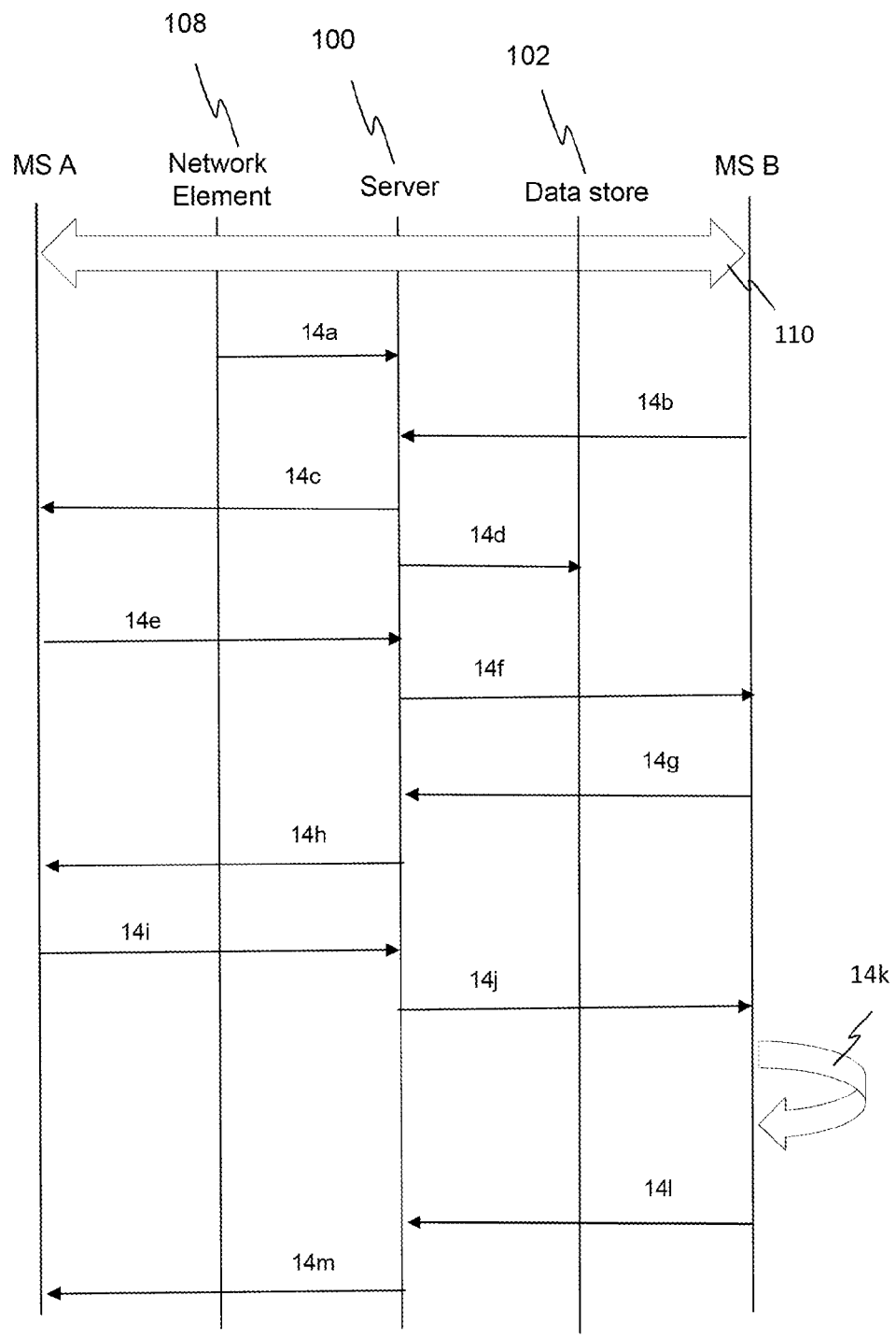
FIG. 14 is a flow diagram depicting operation of embodiments using the system of FIG. 12.

FIG. 14 is a flow diagram depicting operation of embodiments, for example implemented in a system depicted in FIG. 7. Similarly to FIG. 2 described above, a voice call is currently in progress between MS A in PLMN A and MS B in PLMN B, as shown by item 110. MS B and MS A include geographical location modules, such as Global Positioning System (GPS) modules, capable of receiving geographical location data based on the physical location of MS A and MS B respectively. MS A and MS B both have map creation applications for creating maps for display on MS A and MS B respectively.

FIG. 14 depicts embodiments where the geographical location of MS B is 'pulled' from MS B by MS A.

Network element 108 receives in-call signaling information for the call between MS A and MS B which triggers notification of call party details, including TDN A and TDN B, for the call to server 100 in step 14a.

Application software running on MS B detects the call in progress between MS B and MS A and notifies server 100 of call party details for the call, e.g. the TDNs of telephones involved in the call, TDN A associated with MS A and TDN B associated with MS B, in step 14b.

Server 100 identifies that the notification of step 14a from network element 108 and the notification of step 14b from MS B have call party details, TDN A and TDN B, in common and establishes a communications session, separate from the telephone call between MS A and MS B, for the communication of data between MS A and MS B. The separate communications session is established whilst the telephone call is in progress on the basis of the received call party details, e.g. TDN A and TDN B. Once the separate communications session is established, voice call data is transmitted via the telephone call and other data can be transmitted via the separate communications session.

Server 100 notifies MS A that a call has been detected between MS A and MS B and that a separate communications session has been established between MS A and MS B in step 14*c*.

Server 100 updates the records for MS A and MS B in data store 102 in step 14*d* to indicate that a call is in progress between MS A and MS B and that a separate communications session between MS A and MS B has been established.

In these embodiments, the user of MS A wishes to obtain geographical location data for MS B, for example to use in relation to a map creation application running on MS A. MS A transmits a geographical location capability check message to server 100 in step 14*e*; the capability check message is for checking the capability of MS B to provide geographical location data relating to its physical location, for example checking if MS B has a map creation application running on it.

Server 100 forwards the geographical location capability check message on to MS B in step 14*f*. Mobile station MS B responds by sending a geographical location capability response message to server 100 in step 14*g* which forwards this on to MS A in step 14*h*; the capability response message includes information as to whether MS B can provide geographical location data relating to its physical location.

In this embodiment, the capability response message informs MS A that MS B is able to provide geographical location data (by use of its geographical location module), so MS A transmits a request for geographical location data for MS B to server 100 in step 14*i*. Server 100 forwards the request from MS A to MS B in step 14*j*.

When MS B receives the request for geographical location data from server 100 in step 14*j*, MS B instructs its geographical location module to carry out a geographical location process and provide geographical location data relating to the physical location of MS B in step 14*k*. The geographical location data resulting from step 14*k* is transmitted to server 100 in step 14*l*. Server 100 then transmits data including or derived from the geographical location data received in step 14*l* to MS A in step 14*m*.

The map creation application of MS A can use the geographical location data received from server 100 in step 14*m* to create a map which incorporates a representation of the physical location of MS B. For example, the received geographical location data may include a grid reference or longitude and latitude parameters which can be processed by the map creation application to plot the location of MS B within a map stored or accessible by MS A. Such embodiments could for example be useful for the user of MS A to give directions to MS B verbally during the telephone call being conducted via MS A and MS B with reference to the created map and indication of the location of MS B thereon.

In embodiments, steps 14*i* to 14*m* are repeated, allowing display of a dynamically updating map on MS A that shows changes in the physical location of MS B as they happen. Alternatively, steps 14*k* to 14*m* can be repeated allowing updating of the map on MS A without further requests as per steps 14*i* and 14*j* being required.

In embodiments where MS B is not able to provide geographical location data, for example because MS B has no geographical location module or other such capability, the capability response message of step 14*g* will state so, thus informing MS A that communication of geographical location data from MS B is not possible. In alternative embodiments where MS B is not able to provide geographical location data, MS B may not send any capability response message, and after a predetermined period with no response being received, MS A might conclude that communication of geographical location data from MS B will not be possible.

In further alternative embodiments, the geographical location capability check message of step 14*e* can be combined with the request for geographical location data of step 14*i* and the geographical location capability response message of step 14*g* can be combined with the transmittal of geographical location data of step 14*l*.

Figure 15:
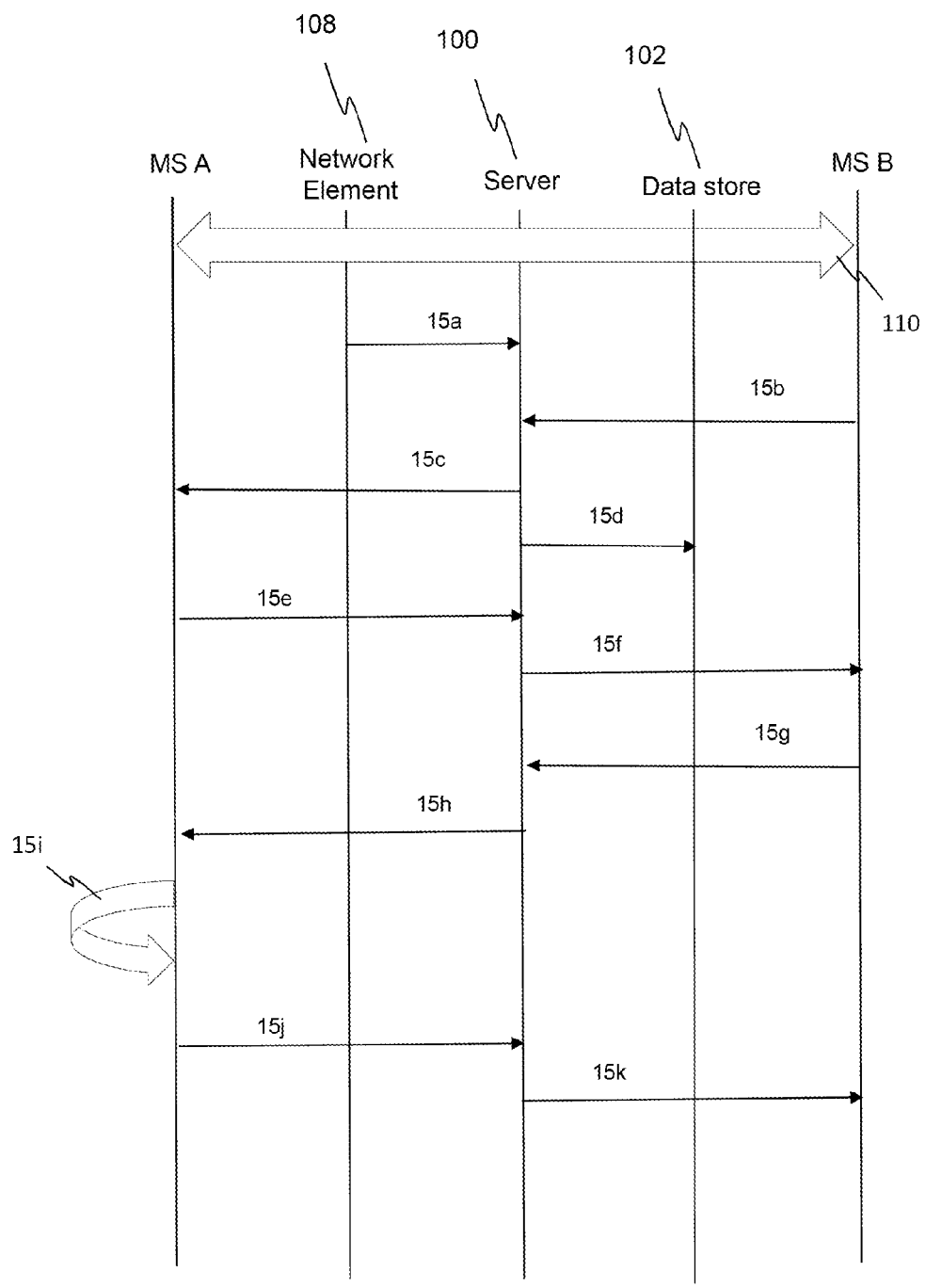
FIG. 15 is a flow diagram depicting operation of embodiments using the system of FIG. 12.

FIG. 15 is a flow diagram depicting operation of embodiments, for example implemented in a system depicted in FIG. 7. In FIG. 15, steps 15*a* to 15*d* occur in a similar manner as per steps 14*a* to 14*d* described above in relation to FIG. 14.

FIG. 15 depicts embodiments where the geographical location of MS A is 'pushed' from MS A to MS B.

In these embodiments, the user of MS A wishes to send geographical location data for MS A to MS B.

Some embodiments involve MS A checking the capability of MS B to process and/or display geographical location data by transmitting a geographical location capability check message to server 100 in step 15*e*. Server 100 forwards the geographical location capability check message on to MS B in step 15*f*. Mobile station MS B responds by sending a geographical location capability response message to server 100 in step 15*g* which forwards this on to MS A in step 15*h*.

In this embodiment, the capability response message informs MS A that MS B is able to process geographical location data (by use of its map creation application), so the user of MS A triggers generation of appropriate geographical location data by appropriate input to the mapping application of MS A. Alternatively, generation of geographical location data could occur upon receipt of the capability response message of step 15*h* without any input from the user of MS A being required.

MS A instructs its geographical location module to carry out a geographical location process and provide geographical location data relating to the physical location of MS A in step 15*i*. The geographical location data resulting from step 15*i* is transmitted to server 100 in step 15*j*. Server 100 then transmits data including or derived from the geographical location data received in step 15*j* to MS B in step 15*k*.

The map creation application of MS B can use the geographical location data received from server 100 in step 15*k* to create a map which incorporates a representation of the physical location of MS A. Such embodiments could for example be useful for the user of MS B to give directions to the user of MS A verbally during the telephone call being conducted via MS A and MS B with reference to the created map and indication of the location of MS A thereon.

In embodiments, steps 15*i* to 15*k* can be repeated, allowing display of a dynamically updating map on MS B that depicts changes in the physical location of MS A as they occur.

In alternative embodiments, MS B has no map creation application for creating maps for display on MS B, but does have the capability to display images, such information being indicated in the location capability response message of step 15*g*. In such embodiments, the MS A itself plots a map containing a physical representation of its physical location and creates an map image (for example a screenshot from the map creation application) depicting this information for transmittal to MS B via server 100 in steps 15*j* and 15*k*; these steps would therefore involve transmittal of media (image) data. Upon receipt of the image data, MS B is able to display the image of the map created and provided by MS A, thus allowing the user of MS B to view a representation of the physical location of MS A even though MS B has no map creation capability itself.

In further alternative embodiments where MS B has no map creation application for creating maps for display on MS B, but does have the capability to display images, a network link, such as a URL, for an online mapping service such as Google Maps™ is transmitted to MS B. The network link contains information relating to the physical location of MS A and can be created by MS A and transmitted to server 100 for transmittal on to MS B, or can be derived from the geographical location data received from MS A by server 100 and transmitted on to MS B. When MS B receives the network link, it accesses the mapping service using the received network link. The mapping service uses the information in the network link relating to the physical location of MS A to generate a map image including a representation of the physical location of MS A and transmits the map image to MS B. Once MS B has downloaded the map image, it displays the map image to the user of MS B, thus allowing the user of MS B to view a representation of the physical location of MS A even though MS B has no map creation capability itself.

In embodiments, the geographical location data is received by server 100 in the form of a data object including geographical coordinate data. A capability check can then be carried out by server 100 in relation to whether the respective user device is capable of processing the geographical coordinate data during the separate communications session. If the capability check indicates that the respective user device is capable of processing the geographical coordinate data, server 100 will transmit the geographical coordinate data during the separate communications session.

Establishing the separate communication session may comprise receiving a client-server connection request from, and establishing a client-server connection with the appropriate user device, and transmitting the data including or derived from the received geographical location data via the client-server connection.

Embodiments described below in relation to FIGS. 16 to 19 involve enabling the receipt of pre-configured user data by user devices during telephone calls conducted between the user devices. The pre-configured user data is specified by a user of a user device prior to establishment of a telephone call as data for receipt by other user devices during telephone calls conducted by the user.

The separate communication session is used to receive user data other than the call party details (such as the telephone dialing numbers) of a call without the participants to the call having to explicitly transmit the user data themselves. In embodiments, enabling of the receipt of the pre-configured user data occurs during a call between user devices and is triggered by establishment of a separate communications between the user devices.

The pre-configured user data is specified by a user of a user device as data for receipt by other user devices during telephone calls between the user and other users, e.g. the user can choose certain user data prior to making a telephone call which will be received by the other user device of the other party (or parties in the case of a teleconference) to the telephone call via the separate communication session. The pre-configured user data may comprise data other than the first and second identities received in the call party details of a call.

A user may specify their user data for receipt by other user devices during telephone calls via their telephony user device, for example using personal information manager, PIM, application software on their telephony user device. A user may configure their pre-configured user data by linking to a record in the PIM. A user may also specify their pre-configured user data for transmittal during telephone calls directly to server 100, for example via a web interface.

Figure 16A:
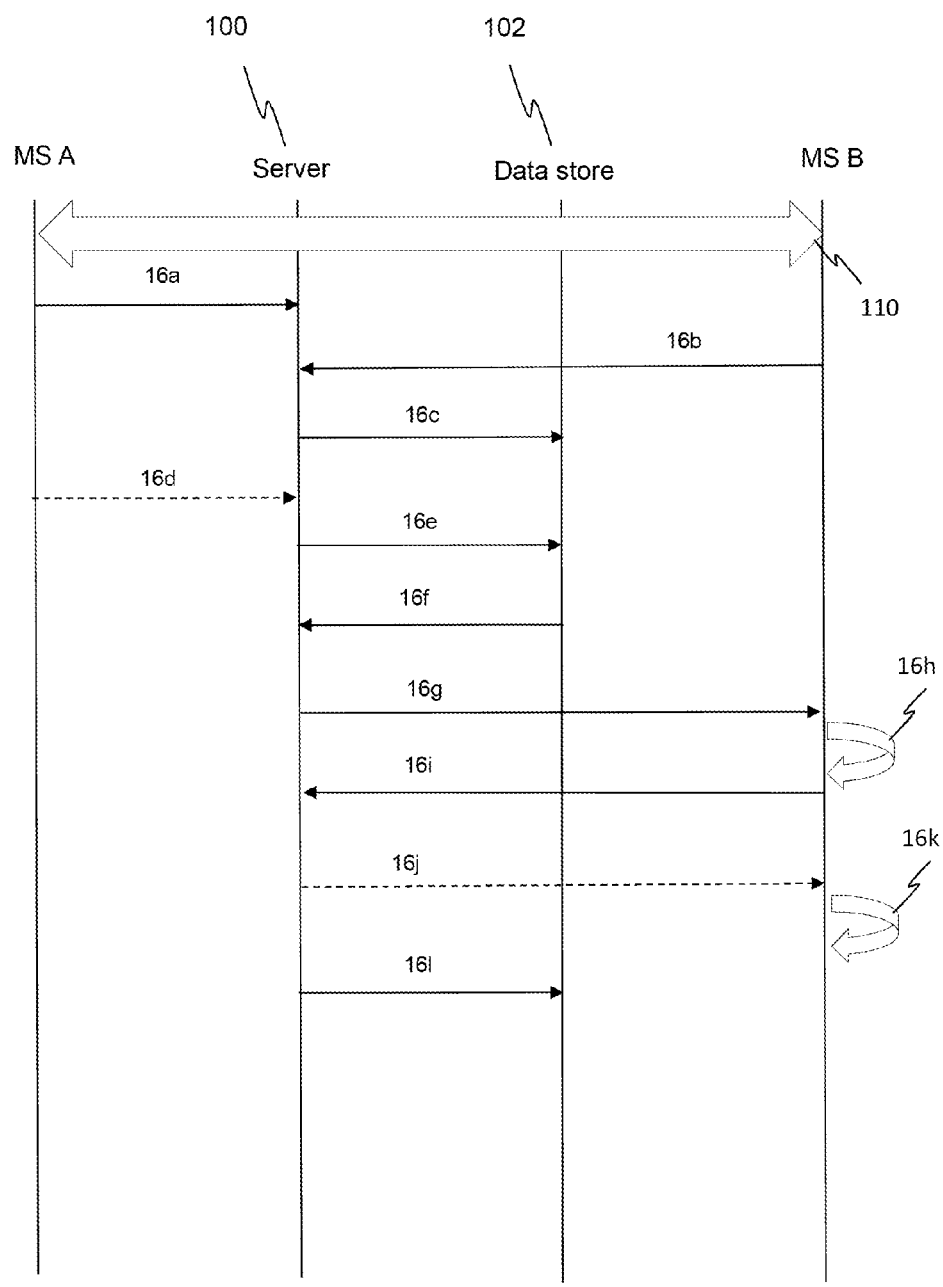
FIGS. 16A and 16B show a flow diagram depicting operation of embodiments using the system of FIG. 1.
Figure 16B:
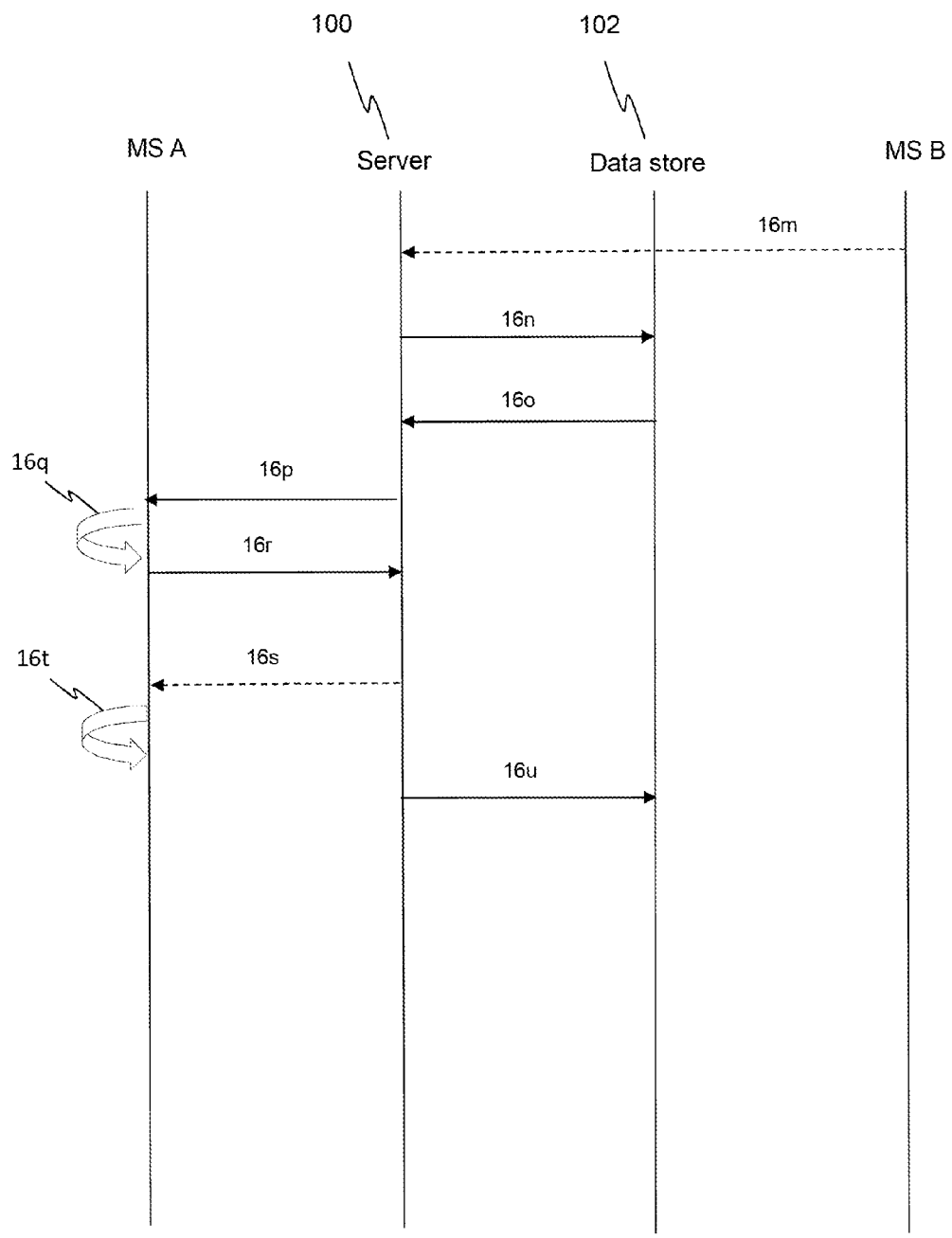

FIGS. 16A and 16B show a flow diagram depicting operation of embodiments using the system of FIG. 1.

In these embodiments, the user of MS A has specified, prior to establishment of telephone calls conducted by the user, pre-configured user data for receipt by other user devices during telephone calls conducted using MS A; the user's pre-configured user data is stored on memory associated with MS A.

Similarly, the user of MS B has specified, prior to establishment of telephone calls conducted by the user, pre-configured user data for receipt by other user devices during telephone calls conducted using MS B; the user's pre-configured user data is stored on memory associated with MS B.

These embodiments involve enabling the receipt of pre-configured user data configured by the user of MS A by MS B via a separate communications session and also involve enabling the receipt of pre-configured user data configured by the user of MS B by MS A via a separate communications session during a call conducted using MS A and MS B.

Similarly to FIG. 2 described above, a voice call is currently in progress between MS A in PLMN A and MS B in PLMN B, as shown by item 110. Application software running on MS A detects the call in progress between MS A and MS B and notifies server 100 of call party details for the call, e.g. the TDNs of telephones involved in the call, TDN A associated with MS A and TDN B associated with MS B, in step 16a. Similarly, application software running on MS B detects the call in progress between MS B and MS A and notifies server 100 of call party details for the call, e.g. the TDNs of telephones involved in the call, TDN B associated with MS B and TDN A associated with MS A, in step 16b.

Server 100 identifies that the notification of step 16a from MS A and the notification of step 16b from MS B have call party details, TDN A and TDN B, in common and establishes a communications session, separate from the telephone call between MS A and MS B, for the communication of data between MS A and MS B. The separate communications session is established on the basis of the received call party details, e.g. TDN A and TDN B. Once the separate communications session is established, voice call data is transmitted via the telephone call and other data can be transmitted and received via the separate communications session.

Server 100 updates the records for MS A and MS B in data store 102 in step 16c to indicate that a call is in progress between MS A and MS B and that a separate communications session between MS A and MS B has been established.

Once the separate communications session between MS A and MS B has been established, MS A retrieves pre-configured user data from its memory and transmits this to server 100 in step 16d. Server 100 performs a lookup in data store 102 using TDN A for MS A in step 16e and identifies that a communications session has been established between MS A and MS B.

Server 100 retrieves TDN B for MS B in step 16f and conducts a check to determine whether MS B already has pre-configured user data for the user of MS A stored locally. Conducting the check involves server 100 transmitting a query to MS B in step 16g. Upon receiving the query of 16g, MS B checks its memory to see whether it has pre-configured user data for the user of MS A stored locally in step 16h and transmits a response to server 100 in step 16i. In this case, the response of step 16*i* indicates that at least a part of the pre-configured user data for the user of MS A is not stored locally to MS B, so server 100 transmits pre-configured user data for MS A to MS B in step 16*j*.

In step 16*k*, MS B updates its local memory according to the pre-configured user data received in step 16*j*. Server 100 updates data store 102 in step 16*l* to indicate which pre-configured user data was received by MS B via the separate communications session in step 16*j*.

MS B retrieves pre-configured user data from its memory and transmits this to server 100 in step 16*m*. Server 100 performs a lookup in data store 102 using TDN B for MS B in step 16*n*, identifies that a communications session has been established between MS A and MS B and retrieves TDN A for MS A in step 16*o*.

A check is conducted to determine whether MS A already has pre-configured user data for the user of MS B stored locally. Conducting the check involves server 100 transmitting a query to MS A in step 16*p*. Upon receiving the query of 16*p*, MS A checks its memory to see whether it has pre-configured user data for the user of MS B stored locally in step 16*q* and transmits a response to server 100 in step 16*r*. In this case, the response of step 16*r* indicates that at least a part of the pre-configured user data for the user of MS B is not stored locally to MS A, so server 100 transmits the pre-configured user data for MS B to MS A in step 16*s*.

In step 16*t*, MS A updates its local memory according to the pre-configured user data received in step 16*s*. Server 100 updates data store 102 in step 16*u* to indicate which pre-configured user data was received by MS A via the separate communications session in step 16*s*.

In alternative embodiments, server 100 stores pre-configured user data for a plurality of user devices in data store 102. Data store 102 will include data indicating which user devices have received pre-configured user data in relation to which other user devices, and also which data fields and which versions of pre-configured user data have been transmitted from and received by which user devices. In such embodiments, checks can be carried out at server 100 with reference to data store 102, without the need to query MS B in step 16*g* or MS A in step 16*p*.

In the description of the embodiments of 16A and 16B above, enabling of the receipt of pre-configured user data by MS B is carried out if the check indicates that MS B does not have at least a part of the pre-configured user data for the user of MS A stored locally. In other embodiments, the configured user data comprises a plurality of data fields and the check involves determining whether current versions of the data fields in data stored locally to MS B require updating to more recent versions. In such embodiments, server 100 will include indications of the values and/or versions of data fields of the pre-configured user data received in step 16*d* in the query of step 16*g*.

MS B compares the received data field values and/or versions received in step 16*g* with data field values and/or versions stored locally to MS B in step 16*h*. The response of step 16*i* includes an indication as to which data fields for MS A user data are missing and which require updating. Server 100 transmits the appropriate data field values and/or versions of pre-configured user data for MS A in step 16*j*. Such embodiments can help avoid receipt of the entire pre-configured user data received in step 16*d* to MS B in step 16*j*, e.g. only pre-configured user data required to update MS B can be received and not pre-configured user data which MS B already has. This could for example be particularly useful if the pre-configured user data includes a file having a relatively large file size (such as an image) where repeated transmission/reception of such could have an impact on limited bandwidth resources to/from MS B in PLMN B.

Figure 17:
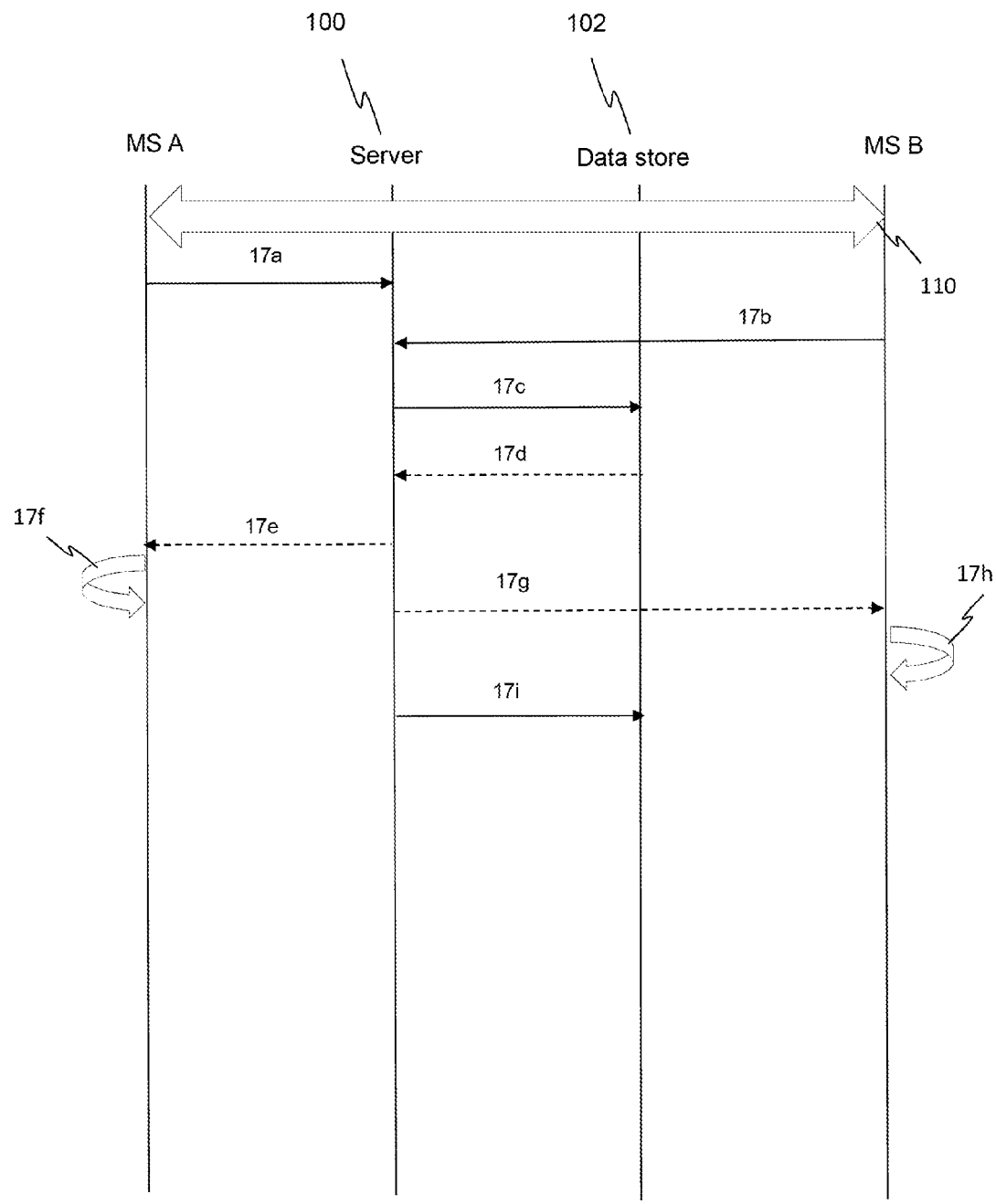
FIG. 17 is a flow diagram depicting operation of embodiments using the system of FIG. 1.

FIG. 17 is a flow diagram depicting operation of embodiments using the system of FIG. 1.

In these embodiments, the user of MS A has specified, prior to establishment of telephone calls conducted by the user, pre-configured user data for receipt by other user devices during subsequent telephone calls conducted using MS A. The user's pre-configured user data has previously been stored in data store 102 associated with server 100, for example transmitted to server 100 from MS A or entered directly to server 100 via a web interface.

Similarly, the user of MS B has specified, prior to establishment of telephone calls conducted by the user, pre-configured user data for receipt by other user devices during subsequent telephone calls conducted using MS B. The user's pre-configured user data has previously been stored in data store 102 associated with server 100, for example transmitted to server 100 from MS B or entered directly to server 100 via a web interface.

Pre-configured user data in data store 102 may be updated via a synchronization process between MS A and server 100. Synchronization may involve periodic update requests being sent from server 100 to MS A, with MS A responding with any updates to the pre-configured user data. Alternatively, MS A may send a pre-configured user data update to server 100 whenever the user of MS A makes an update to pre-configured user data within the memory of MS A.

A similar synchronization process may be carried out for MS B.

These embodiments involve enabling the receipt of pre-configured user data configured by the user of MS A by MS B via a separate communications session and also enabling the receipt of pre-configured user data configured by the user of MS B by MS A via a separate communications session during a call conducted between MS A and MS B.

Similarly to FIG. 16A described above, a voice call is being conducted between MS A and MS B and steps 17*a* and 17*b* occur similarly to steps 16*a* and 16*b* as described above.

Server 100 identifies that the notification of step 17*a* from MS A and the notification of step 17*b* from MS B have call party details, TDN A and TDN B, in common and establishes a communications session, separate from the telephone call between MS A and MS B, for the communication of data between MS A and MS B. The separate communications session is established on the basis of the received call party details, e.g. TDN A and TDN B. Once the separate communications session is established, voice call data is transmitted via the telephone call and other data can be transmitted and received via the separate communications session.

Once the separate communications session between MS A and MS B has been established, server 100 accesses data store 102 to update the records for MS A and MS B in step 17*c* to indicate that a call is in progress between MS A and MS B and that a separate communications session between MS A and MS B has been established.

Step 17*c* also involves server 100 performing a lookup in data store 102 to retrieve pre-configured user data specified for reception by other user devices, including MS B, in relation to MS A and pre-configured user data specified for reception by other user devices, including MS A, in relation to MS B in step 17*d*.

When server 100 receives pre-configured user data specified for transmittal in relation to MS B in step 17*d*, it transmits the pre-configured user data to MS A in step 17*e*. In step 17*f*, MS A updates its local memory according to the pre-configured user data received in step 17*e*.

When server 100 receives pre-configured user data specified for receipt by other user devices in relation to MS A in step 17d, it transmits the pre-configured user data to MS B in step 17g. In step 17h, MS B updates its local memory according to the pre-configured user data received in step 17g.

Server 100 updates data store 102 in step 17i to indicate which pre-configured user data was received by MS A in step 17e and which pre-configured user data was received by MS B in step 17g.

The embodiments of FIG. 17 may include conducting checks for MS A and MS B respectively, either at server 100 or by querying MS A and MS B, in a similar manner as described above for FIG. 16.

Figure 18:
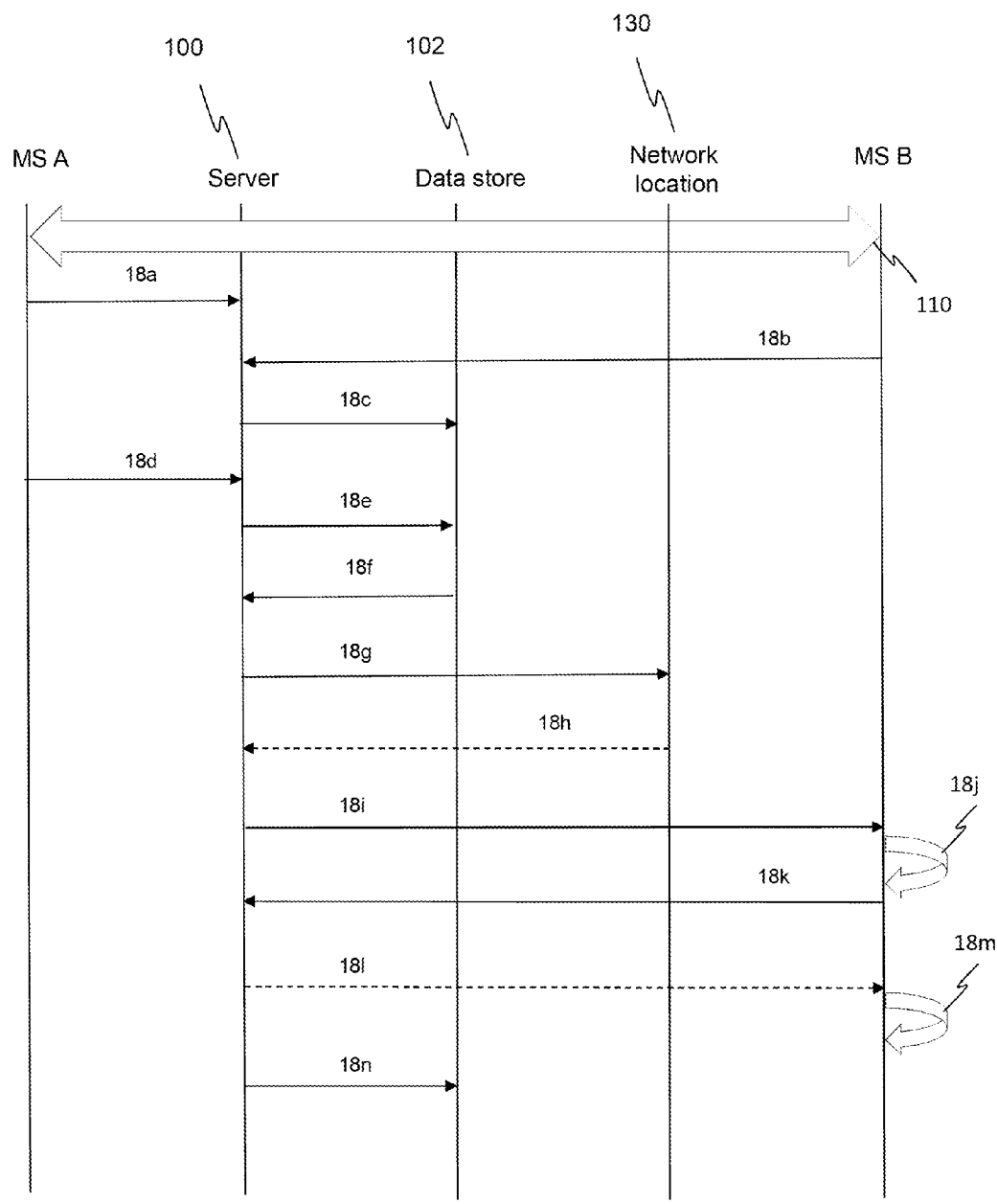
FIG. 18 is a flow diagram depicting operation of embodiments using the system of FIG. 1.

FIG. 18 is a flow diagram depicting operation of embodiments using the system of FIG. 1.

In these embodiments, the user of MS A has specified, prior to establishment of telephone calls conducted by the user, pre-configured user data for reception by other user devices during subsequent telephone calls conducted using MS A. The user's pre-configured user data has previously been stored at network location 130, for example in a database accessible via a web server. The user's pre-configured user data may have been transmitted to network location 130 from MS A or entered directly to network location 130 via a web interface using a personal computer or similar computing device.

These embodiments involve enabling the receipt of pre-configured user data configured by the user of MS A by MS B via a separate communications session during a call conducted using MS A and MS B.

Similarly to FIG. 16A described above, a voice call is being conducted between MS A and MS B and steps 18a and 18b occur similarly to steps 16a and 16b as described above.

Once the separate communications session between MS A and MS B has been established, MS A retrieves an identifier from its memory which identifies pre-configured user data for reception by other user devices during telephone calls conducted by the user of MS A. The pre-configured user data identifier is transmitted to server 100 in step 18d.

Server 100 performs a lookup in data store 102 using TDN A for MS A in step 18e, identifies that a communications session has been established between MS A and MS B, and retrieves TDN B for MS B in step 18f.

In step 18g, server 100 locates and accesses pre-configured user data for the user of MS A at network location 130 on the basis of the identifier received from MS A in step 18d. The pre-configured user data is transmitted from network location 130 to server 100 in step 18h.

Server 100 uses the retrieved TDN B for MS B to conduct a check to determine whether MS B already has pre-configured user data for the user of MS A stored locally. Conducting the check involves server 100 transmitting a query to MS B in step 18i. Upon receiving the query of 18i, MS B checks its memory to see whether it has pre-configured user data for the user of MS A stored locally in step 18j and transmits a response to server 100 in step 18k. In this case, the response of step 18k indicates that at least a part of the pre-configured user data for the user of MS A is not stored in memory in MS B, so server 100 transmits pre-configured user data for MS A to MS B in step 18l.

In step 18m, MS B updates its local memory according to the pre-configured user data received in step 18l. Server 100 updates data store 102 in step 18n to indicate which pre-configured user data was transmitted to and received by MS B in step 18l.

The identifier could be a network address from which the pre-configured user data can be downloaded, for example a Uniform Resource Locator (URL). As an example, the pre-configured user data identifier could be a URL for an online user account such as a social network account, e.g. a user identity associated with a Facebook™ profile; the pre-configured user data could correspond to a public profile of a user's online account. A user can pre-configure within their profile which user data is to be received by other user devices during telephone calls and the URL identifier can be set to point to such. Server 100 can use the URL identifier to contact the appropriate network address in step 18g and download the appropriate pre-configured user data in step 18h.

In the embodiments described above in relation to FIG. 18, the identifier transmitted to server 100 in step 18d is used by server 100 in step 18g to retrieve pre-configured user data from network location 130 in step 18h. In alternative embodiments, the identifier could comprise an identifier for use in retrieving the pre-configured user data from data store 102; in such embodiments, the user of MS A will have previously stored pre-configured user data in data store 102 either transmitted from MS A or entered directly via a web interface using a personal computer or similar computing device.

In alternative embodiments, the notification of step 18a and the identifier transmittal of step 18d are combined into a single step. Similarly, the data store updating of step 18c and data store lookup of step 18e could be combined into a single step.

Figure 19:
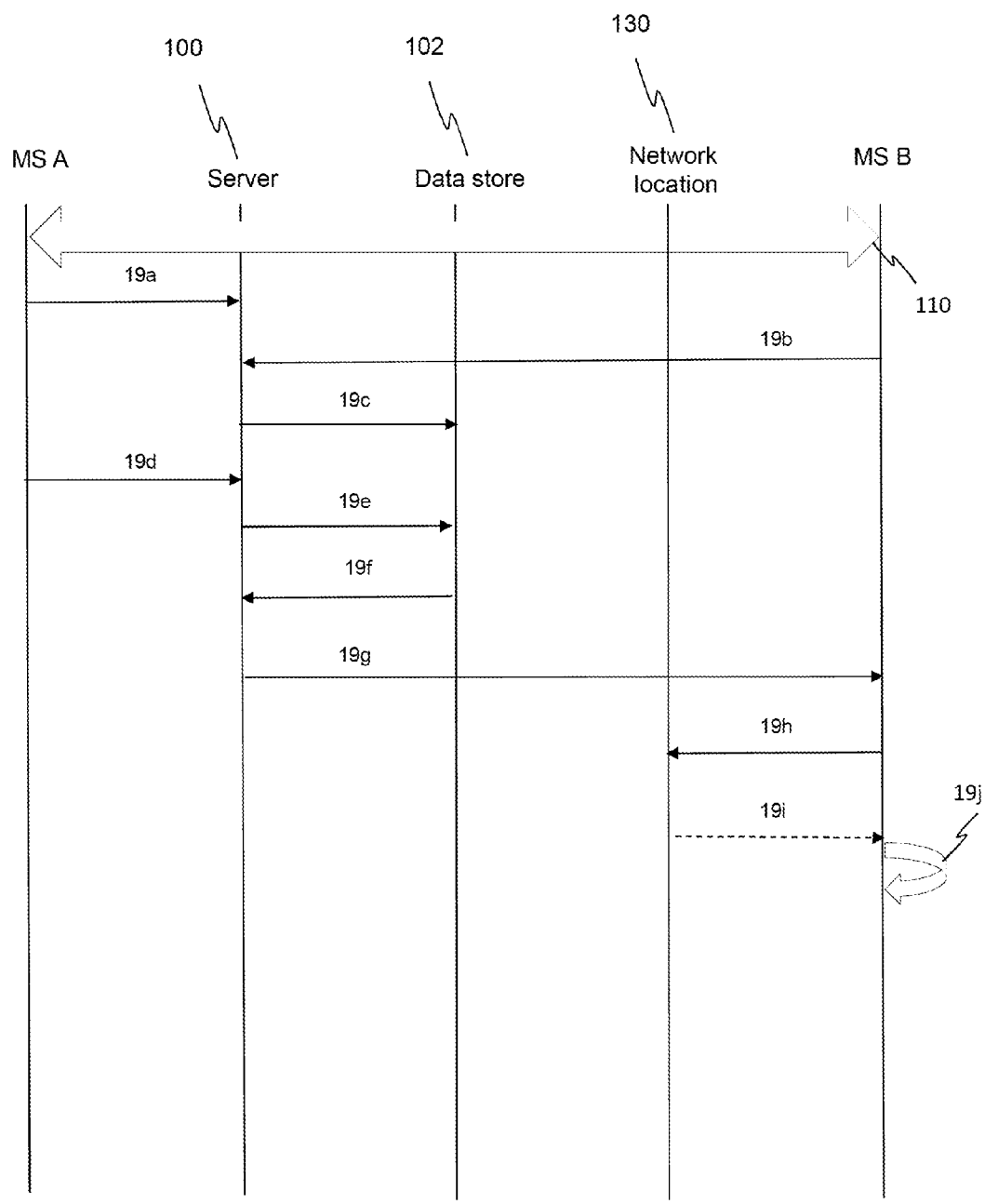
FIG. 19 is a flow diagram depicting operation of embodiments using the system of FIG. 1.

FIG. 19 is a flow diagram depicting operation of embodiments using the system of FIG. 1.

In these embodiments, the user of MS A has specified, prior to establishment of telephone calls conducted by the user, pre-configured user data for reception by other user devices during subsequent telephone calls conducted using MS A. The user's pre-configured user data has previously been stored at network location 130 identified by a pre-configured user data identifier, for example a network address in packet network 106.

These embodiments involve enabling the reception of pre-configured user data configured by the user of MS A by MS B via a separate communications session during a call conducted using MS A and MS B.

Similarly to FIG. 16A described above, a voice call is being conducted between MS A and MS B and steps 19a to 19c occur similarly to steps 16a to 16c as described above.

Once the separate communications session between MS A and MS B has been established, MS A retrieves an identifier from its memory which identifies pre-configured user data for reception by other user devices during telephone calls conducted by the user of MS A. The pre-configured user data identifier is transmitted to server 100 in step 19d.

Server 100 performs a lookup in data store 102 using TDN A for MS A in step 19e, identifies that a communications session has been established between MS A and MS B, and retrieves TDN B for MS B in step 19f.

Server 100 transmits the pre-configured user data identifier received in step 19d to MS B in step 19g. MS B locates and accesses pre-configured user data for the user of MS A at network location 130 on the basis of the identifier received from MS A in step 19h. The pre-configured user data is transmitted from network location 130 to server 100 in step 19i. In step 19j, MS B updates its local memory according to the pre-configured user data received in step 19i.

In other embodiments, the pre-configured user data identifier is stored in data store 102 and can be retrieved from data store 102 by server 100, for example in combination with steps 19e and 19f, without requiring transmittal of the pre-configured user data identifier from MS A to server 100 in step 19d.

Download of the pre-configured user data by MS B may include conducting a check in a similar manner as described above for FIG. 16.

In alternative embodiments, the notification of step 19a and the identifier transmittal of step 19d are combined into a single step. Similarly, the data store updating of step 19c and data store lookup of step 19e could be combined into a single step.

Embodiments involve server 100 instructing a user device to display one or more parts of pre-configured user data received during a call. Instructing a user device to display pre-configured user data could be combined with transmittal of the pre-configured user data or an identifier for the pre-configured user data to a user device, or could involve a distinct instruction step. Such functionality could be particularly useful if for example the pre-configured user data includes a name for a user associated with the pre-configured user data; displaying the name or user identity associated with a user of one user device on another user device involved in a call provides a convenient way to identity a user involved in a telephone call.

The pre-configured user data could comprise a variety of different types of user data such as one or more of a user's name, a social network user identity, an email address, a date, an image file, and a postal or street address.

Transmittal of pre-configured user data in the form of a name or user identity could be useful in identifying a user conducting a call to one or more other parties to the call. If the image is a photo of a calling party, then a similar effect can be achieved.

Transmittal of pre-configured user data in the form of a postal or street address or email address could be useful in identifying how to contact a user by a different communication means after the telephone call is terminated.

Transmittal of pre-configured user data in the form of a date could be useful in highlighting a date of interest to users such as the date of a user's birthday or other such event date.

Embodiments described above involve enabling receipt of pre-configured user data associated with the user of a user device to one or more other devices during a call between the user devices. In other embodiments, a user specifies different pre-configured user data for receipt by one or more pre-defined user devices during calls with those user devices. When a user configures their user data, they can pre-define one or more subsets of their pre-configured user data for receipt during calls with one or more pre-defined user devices of their choosing.

Configuration could for example involve associating one or more user devices into different groups such as a family group, a work group etc. Different pre-defined user data can then be received during a call with a user device in the family group than pre-defined user data received during a call with a user device in the work group.

Embodiments involve identifying that a call is being conducted with a pre-defined user device on the basis of received call party details for the call, for example a telephone dialing number associated with a user device pre-defined by a user. When a call with such a pre-defined user device is identified, the subset of pre-configured user data can be received the pre-defined user device instead of or in addition to the pre-defined user data received by other non-pre-defined user devices.

Embodiments involve a telephony user device capable of establishing a communications session for communication of data with respect to at least one other user device in a data communications network, the telephony user device comprising a data store and being capable of:

transmitting call party details of a telephone call, the telephone call involving at least the telephony user device, the telephony user device being a first telephony user device, and a second telephony user device, the call party details including a first identity associated with the first telephony user device and a second identity associated with the second telephony user device, at least one of the first and second identities comprising a telephone dialing number;

establishing, on the basis of the first and second identities received in the call party details, a separate communications session, separate from the telephone call, for the communication of data to and/or from the at least one other user device;

receiving data from the at least one other user device via the separate communications session; and presenting the user of the telephony user device with an option to update the data store with at least a part of the received data.

In such embodiments, the received data need not be user data and need not have been have been specified by a user of a user device prior to the establishment of the telephone call as data for receipt by other user devices during telephone calls conducted by the user.

In such embodiments, upon receipt of data at a user device, the user device may carry out a search of a local data store or internal memory to see if data corresponding to the received data or part thereof is already stored with the data store. If the search of a user device's data store does not find data corresponding to at least a part of the received data in its store, then the data store can be updated with one or more parts of the received data accordingly.

When the data is received at a user device, one or more parts of the received data may be displayed by the user device during the call, for example the name of the other party to the call could be displayed during the call. The display may occur in response to receipt of a display instruction from server 100 and may include giving the user the option to allow display of the data or not.

Displaying the received data may involve overlaying the display of the received data over other data displayed during the call. The received data may for example be overlaid over other data already displayed in association with an in-call screen application (or call dialing application) running on the user device and operable via a touch-screen interface; such an application will typically involve display of a number of touch-sensitive icons for inputting telephone dialing number digits and facilitating operations such as 'dial number', 'end call', 'hold call' etc. The other data may also include a telephone number or other identifier associated with a calling or called party for the call. Overlaying the received data may involve displaying the received data in a translucent manner such that other data displayed during the call can also be seen through the displayed received data. Alternatively, overlaying the received data may involve displaying the received data in a non-translucent manner to replace data already displayed during the call, for example the display of the telephone dialing number of the other party to the call could be replaced by the name of the other party to the call.

When the data is received at a user device, the user device may present the user with an option to update the user device data store with the received data, for example by appropriate output on a display of the user device. The user can authorize updating of the data store by user input via a telephony device user input interface.

The option to update the data store of a user device with received data may be presented when the users are still conducting a telephone call. Alternatively, or in addition, the update option is presented to a user after termination of the call.

Termination of the call may be detected by application software on the telephony user device which is capable of detecting termination of calls made by the telephony user device.

Alternatively, the telephony user device may receive notification of termination of the call from the data communications network, for example from a network entity such as server 100, network element 108 or SCP 150.

The telephony user device may temporarily update its data store with all or a part of the data received via the separate communication session for the duration of the call. The user can then be presented with the option to confirm the temporary (in-call) updating of the data store after termination of the call.

In alternative embodiments, the data store of the telephony user device is updated in response to receipt of data via the separate communications session without the user being presented with the option to accept the update(s) or not.

Embodiments allow the user of the telephony user device to choose if and to what extent the data store of their telephony user device is updated with data received via the separate communication session. Such embodiments may for example involve allowing the user to configure settings such that any updates for data received from a particular contact in the telephony user device address book are rejected, or data received from a particular contact are only used to update the data store a single time, or data received from contacts contained in the telephony user device address book are used to update the date store without requiring confirmation from the user. Another embodiment might involve allowing a user to create a black-list of a number of contacts from which received data are not to be used to update the data store.

Embodiments described below in relation to FIGS. 20 to 24 involve a user of one user device recommending a downloadable resource (or more than one downloadable resource) for download to the user device of another user (or to a plurality of user devices of other users). The recommended downloadable resource could for example be a software application (e.g. a game), a software component (e.g. a plug-in), audio data (e.g. an mp3 (Moving Picture Experts Group-2 Audio Layer 3) music file), image data (e.g. a photo), and video data (e.g. a Moving Picture Experts Group-4 file).

Download of a recommended downloadable resource is tracked such that when the recommended downloadable resource is downloaded, a predetermined identifier is associated with the download such that the recommendation of the downloadable resource for download by or via the predetermined identifier can be recognized and the predetermined affiliate credited or otherwise rewarded accordingly. Tracking of the download may be enabled via use of an affiliate identifier which identifies the appropriate predetermined affiliate.

Such embodiments can be used to allow a user to share a third-party mobile phone application (or 'app') with a person they are talking to over the phone, for example allowing one user to recommend a favorite game to another user.

Such embodiments could for example be implemented on a mobile phone by use of a "recommend a download" option (for example implemented via a soft-key icon on a touchscreen user interface) which allows a local user to select a downloadable resource such as an application they want to recommend (possibly from a list of apps installed on the phone) to a user of a remote mobile phone they are conducting a telephone call with. A link, for example a URL to an app store where the recommended downloadable resource can be purchased and downloaded, is then sent to the phone of the remote user. The link is operable to associate a predetermined affiliate, e.g. the user recommending the app, with the download; in this way, the app store is notified of the affiliate recommendation that led to the purchase of the app and can credit the affiliate accordingly. The app store may pay the affiliate a bounty (perhaps a fixed fee or a percentage of the purchase price) for each app bought via an affiliate recommendation.

In some embodiments, the predetermined identifier identifies the user conducting the telephone call and recommending the downloadable resource. In such embodiments, the affiliate identifier may comprise an identity associated with the user device of the user conducting the call such as the telephone dialing number of the user device.

In other embodiments, the predetermined identifier identifies a service provider associated with generation of the transmissible identifier. In such embodiments, the predetermined identifier may comprise an identity associated with a network entity operated by the service provider, for example an IP address of a server.

Figure 20:
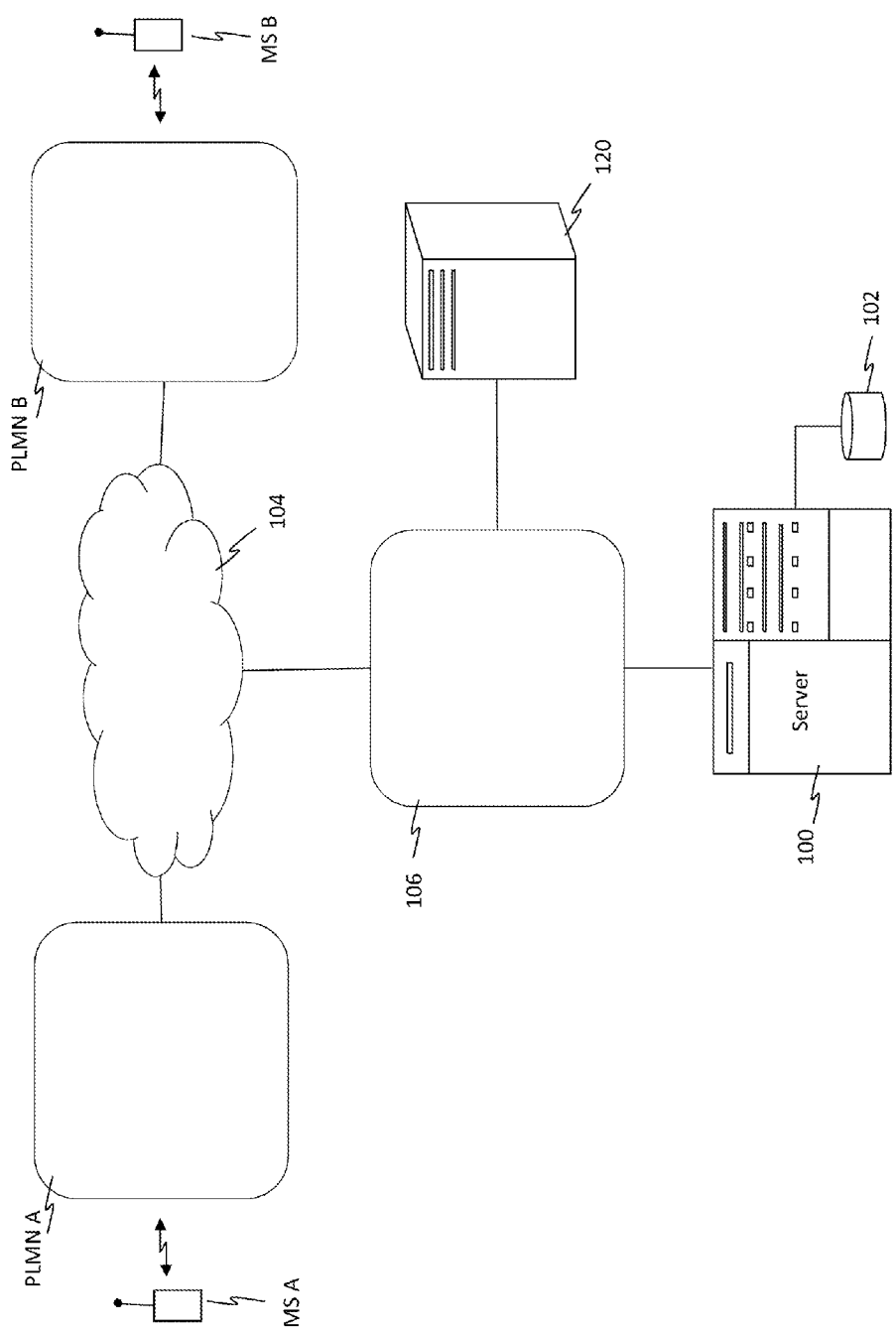
FIG. 20 is a system diagram according to embodiments.

FIG. 20 is a system diagram showing a data communications network according to embodiments. FIG. 20 includes some entities similarly depicted and labeled to FIG. 1, with such entities functioning in a similar manner. In addition, the system of FIG. 20 includes a content server 120 connected to packet network 106 at which electronic content can be provided, for example via electronic download as described above in relation to FIG. 9. Content server 120 could comprise an app store and the electronic content could comprise one or more electronic files, for example software applications such as computer games, plug-ins, or media data such as music, videos, etc.

Figure 21:
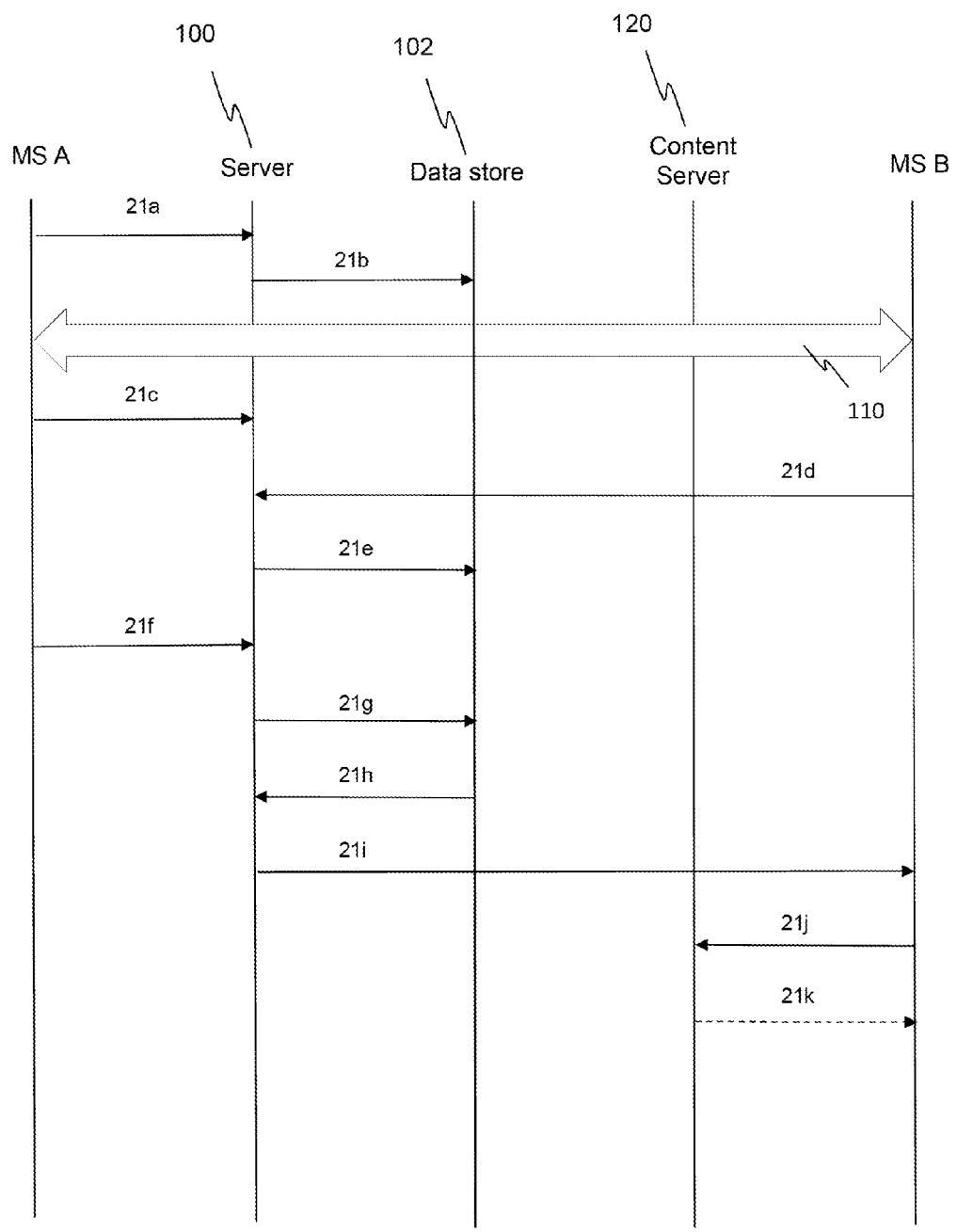
FIG. 21 is a flow diagram depicting operation of embodiments using the system of FIG. 20.

FIG. 21 is a flow diagram depicting operation of embodiments, for example implemented in a system depicted in FIG. 20.

In these embodiments, the predetermined affiliate comprises a user of user device MS A. Prior to a call between MS A and MS B, MS A transmits an affiliate identifier which identifies the user of MS A to server 100, as shown by step 21a.

The predetermined identifier could comprise a name, email address, telephone dialing number, nickname, username, number, alphanumeric string, etc.

In step 21b, server 100 updates data store 102 with the affiliate identifier associated with MS A. A voice call is subsequently conducted between MS A in PLMN A and MS B in PLMN B, as shown by item 110.

The predetermined identifier could be transmitted to server 100 in a text or email message or could be entered on a registration page of a web-server interface of server 100 using a browser application running on MS A.

Similarly as described above in relation to FIG. 2, application software running on MS A detects that there is a call in progress between MS A and MS B and notifies server 100 of call party details for the call e.g. the TDNs of telephones involved in the call, TDN A associated with MS A and TDN B associated with MS B, in step 21c, and application software running on MS B detects the call in progress between MS B and MS A and notifies server 100 of call party details, e.g. TDN A and TDN B, for the call in step 21d.

Server 100 identifies that the notification of step 21c from MS A and notification of step 21d from MS B have call party details, TDN A and TDN B, in common and establishes a separate communications session, separate from the telephone call, for the communication of data between MS A and MS B. Server 100 updates the records for MS A and MS B in data store 102 to indicate that a call is in progress between MS A and MS B and that a communications session between MS A and MS B, separate to the voice call between MS A and MS B, has been established in step 21*e*.

During the call, the user of MS A decides to recommend one or more downloadable resources to the user of MS B and using appropriate input on MS A transmits an identifier identifying one or more downloadable resources to server 100 in step 21*f*. The identifier may be a network address such as a URL for a location where the one or more downloadable resources may be downloaded. Appropriate input from the user of MS A might involve pressing a 'recommend a download' icon on a touch-screen user interface on MS A and subsequently selecting a particular installed file via a file manager or web browser application running on MS A. This installed file may correspond to a downloadable resource, which is available from a remote network data store.

When server 100 receives the identifier identifying one or more downloadable resources of step 21*f*, it performs a lookup in data store 102 using TDN A for MS A in step 21*g* and identifies that a communications session has been established between MS A and MS B.

Server 100 retrieves the affiliate identifier for MS A and TDN B for MS B from data store 102 in step 21*h*. Server 100 then generates a transmissible identifier based at least in part on the identifier received from MS A in step 21*f*. The transmissible identifier is operable to, in response to download of the one or more downloadable resources using the transmissible identifier, associate a predetermined affiliate, e.g. the user of MS A, with the download.

In some embodiments, both the establishment of a separate communication session and the generation of a transmissible identifier may be carried out by a single server. In other embodiments, the establishment of a separate communication session is carried out by a different server to that which generates the transmissible identifier.

Server 100 then enables the download of the one or more downloadable resources to MS B by transmitting the transmissible identifier to MS B in step 21*i*.

When the transmissible identifier is received at MS B, the user of MS B uses the transmissible identifier to locate the one or more downloadable resources recommended by the user of MS A in step 21*j* and download of the one or more downloadable resources to MS B occurs in step 21*k*.

Download of the one or more downloadable resources to MS B using the transmissible identifier in step 21*k* results in the user of MS A being associated with the download, thus allowing the user of MS A to be rewarded or otherwise credited for recommending the one or more downloadable resources to the user of MS B. The user of MS B may choose to download the one or more downloadable resources either during the call with the user of MS A, or after the call has been terminated.

In some embodiments, when the download from content server 120 occurs, the transmissible identifier indicates to content server 120 that the recommendation came from via MS A and content server 120 can thus identify the user of the MS A as the predetermined affiliate associated with the download to MS B. Content server then increments an account associated with the predetermined affiliate in order to keep track of recommendations provided via MS A which resulted in downloads to other user devices.

In other embodiments, when the download from content server 120 occurs, the transmissible identifier indicates to content server 120 that it should transmit a download notification message to a predetermined network address. The predetermined network address could correspond to a download tracking entity (not shown) responsible for keeping track of downloadable resource recommendations and resulting downloadable resource downloads for a plurality of content servers. The download tracking entity can thus recognize that the user of MS A recommended the one or more downloadable resources that were subsequently downloaded by the user of MS B and credit the user of MS A accordingly. In such embodiments, the predetermined network address may be transmitted by server 100 to MS B and on to content server 120 in conjunction with steps 21*i* and 21*j*, or alternatively, content server 120 could be configured with knowledge of the predetermined network address prior to the call between MS A and MS B.

In embodiments, generating the transmissible identifier comprises inserting a predetermined identifier into the received identifier, with the result being the transmissible identifier. The inserted predetermined identifier could comprise an identity associated with the user device of the user recommending the one or more downloadable resources for download, for example comprising one or more of the identities upon which establishment of the separate communications session is based. Alternatively, the inserted predetermined identifier could comprise an identity associated with a network entity operated by a service provider.

In some embodiments, if the received identifier is a URL for a network location at which one or more downloadable resources can be downloaded, then the transmissible identifier comprises a URL which points to the same network location at which the one or more downloadable resources can be downloaded, but which also contains a predetermined identifier for the user device from which the downloadable resource download recommendation originated which can be used by content server 120 to identify the user device which was the source of the download recommendation.

In other embodiments, if the received identifier is a URL for a network location at which one or more downloadable resources can be downloaded, then the transmissible identifier comprises a URL for a different network location at which the one or more downloadable resources may be downloaded and where the user of MS A can be credited for the recommendation that led to the download of the one or more downloadable resources to a user device of another user.

Figure 22:
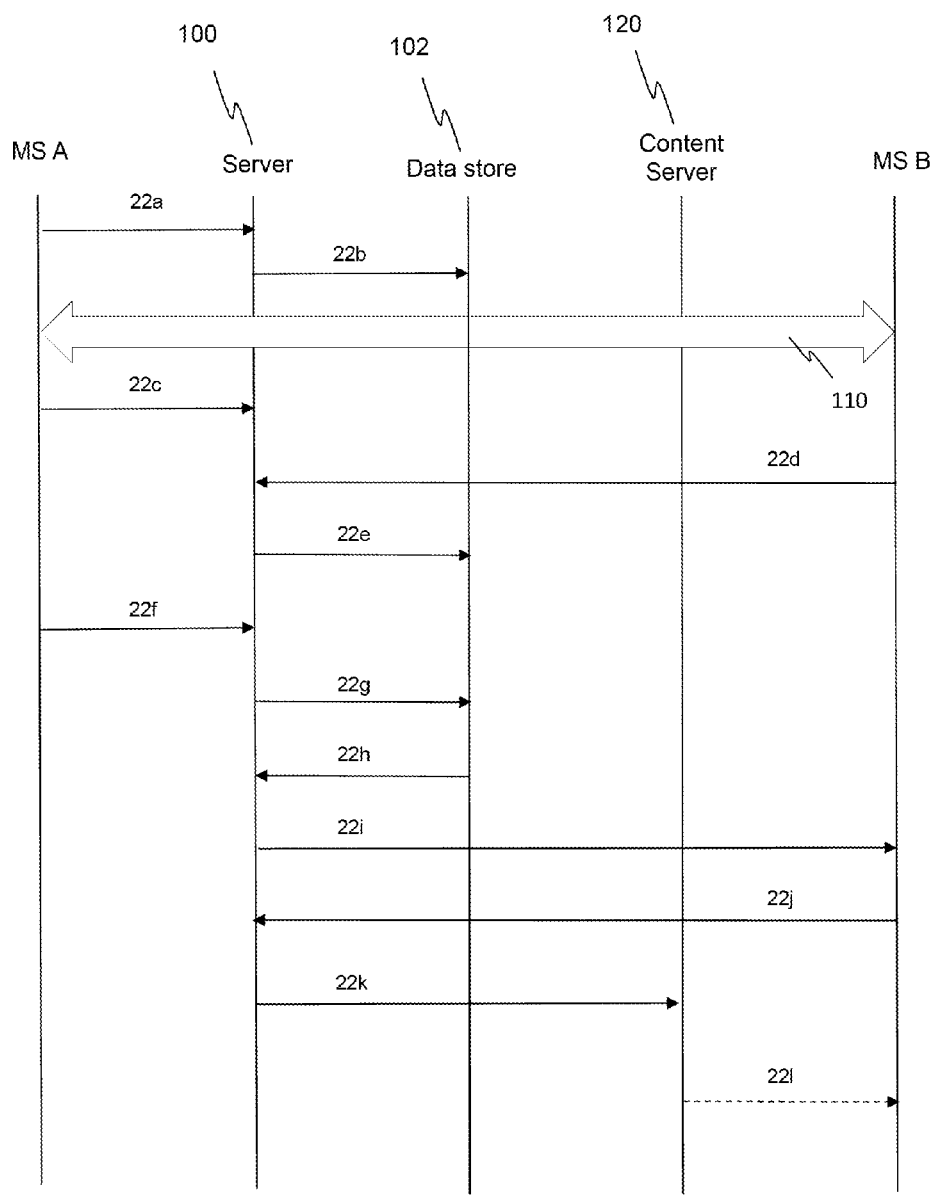
FIG. 22 is a flow diagram depicting operation of embodiments using the system of FIG. 20.

FIG. 22 is a flow diagram depicting operation of embodiments, for example implemented in a system depicted in FIG. 20. Similarly to FIG. 21 described above, the predetermined affiliate comprises a user of user device MS A, and MS A transmits an affiliate identifier which identifies MS A to server 100 in step 22*a*. Server 100 updates data store 102 with the affiliate identifier associated with MS A in step 21*b*. A voice call is subsequently conducted between MS A in PLMN A and MS B in PLMN B, as shown by item 110.

Application software running on MS A detects that there is a call in progress between MS A and MS B and notifies server 100 of call party details for the call in step 22*c*, and application software running on MS B detects the call in progress between MS B and MS A and notifies server 100 of call party details for the call in step 22*d*. Server 100 identifies that the notification of step 22*c* from MS A and notification of step 22*d* from MS B have call party details in common and establishes a separate communications session, separate from the telephone call, for the communication of data between MS A and MS B. Server 100 updates the records for MS A and MS B in data store 102 accordingly in step 22*e*.

During the call, the user of MS A decides to recommend one or more downloadable resources for download to the user of MS B and using appropriate input on MS A transmits an identifier identifying one or more downloadable resources to server 100 in step 22*f*.

When server 100 receives the identifier of step 22*f*, it performs a lookup in data store 102 using TDN A for MS A in step 22*g* and identifies that a communications session has been established between MS A and MS B.

Server 100 retrieves the affiliate identifier for MS A and TDN B for MS B from data store 102 in step 22*h*. Server 100 then generates a transmissible identifier based at least in part on the identifier received from MS A in step 22*f*. The transmissible identifier is operable to, in response to download of the one or more downloadable resources using the transmissible identifier, associate a predetermined affiliate, e.g. the user of MS A, with the download. In this embodiment, the transmissible identifier comprises a network address for server 100. Server 100 then enables the download of the one or more downloadable resources to MS B by transmitting the transmissible identifier to MS B in step 22*i*.

When the user of MS B uses the transmissible identifier to download the one or more downloadable resources, this results in server 100 being contacted by MS B in step 22*j*. Server 100 enables the download of the one or more downloadable resources to MS B by contacting content server 120 in step 22*k* which results in the one or more downloadable resources being downloaded to MS B in step 22*l*. Since server 100 is involved in the download path of the one or more downloadable resources downloaded by MS B, server 100 is able to facilitate the crediting of the download recommendation to the user of MS A.

In some embodiments, server 100 credits the download recommendation to the user of MS A by incrementing an account associated with the appropriate predetermined affiliate, e.g. the user of MS A.

In other embodiments, generating the transmissible identifier may comprise inserting a network address for server 100 into the received identifier and server 100 credits the download recommendation to the user of MS A by transmitting a download notification message to a predetermined network address corresponding to a download tracking entity which identifies the predetermined affiliate as the user of MS A.

Figure 23:
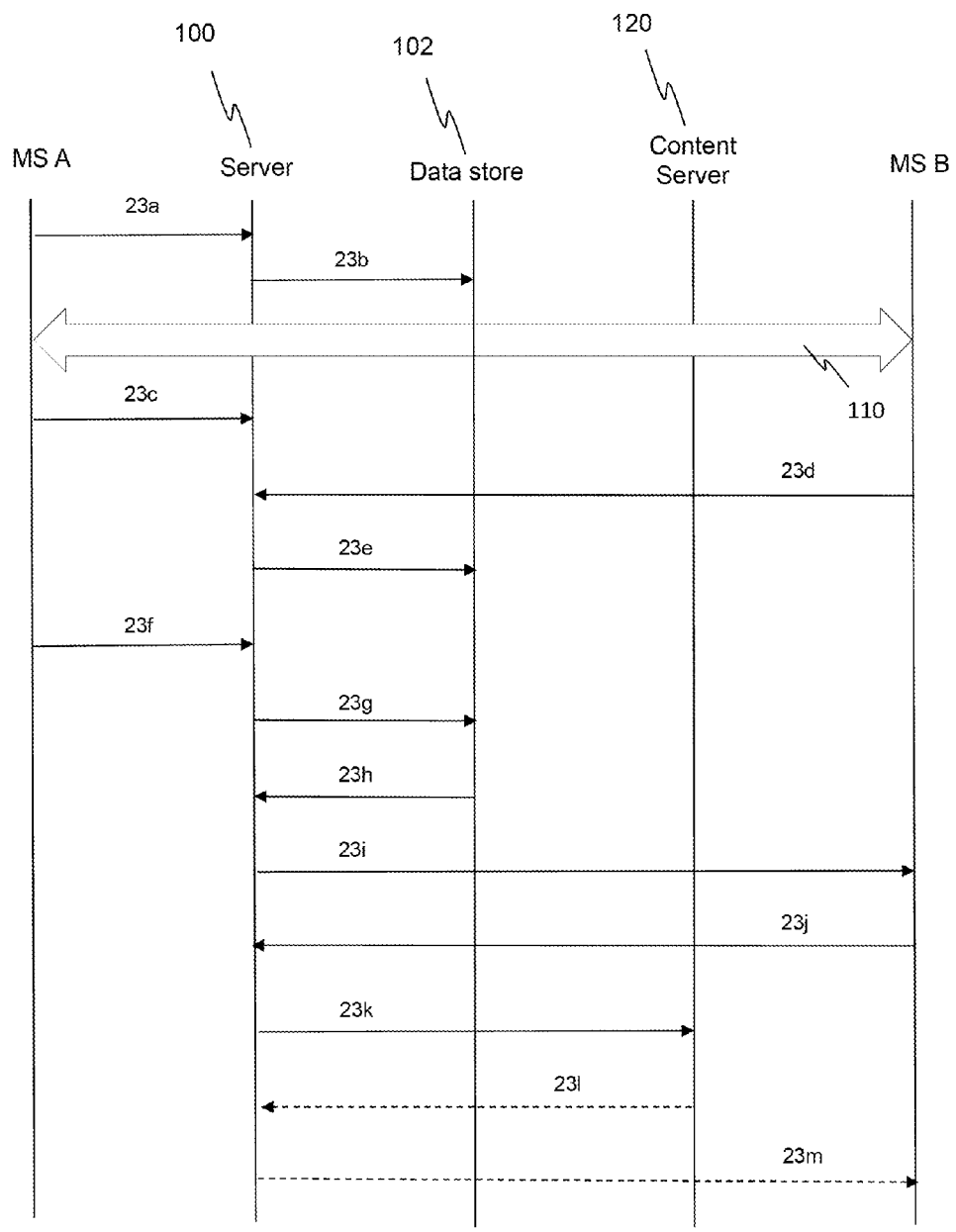
FIG. 23 is a flow diagram depicting operation of embodiments using the system of FIG. 20.

FIG. 23 is a flow diagram depicting operation of embodiments, for example implemented in a system depicted in FIG. 20. Steps 23*a* to 23*j* occur in a similar manner to steps 22*a* to 22*j* described above in relation to FIG. 22.

When the user of MS B uses the transmissible identifier to download the one or more downloadable resources, this results in server 100 being contacted by MS B in step 23*j*. Server 100 enables the download of the one or more downloadable resources to MS B by contacting content server 120 in step 23*k* which results in the one or more downloadable resources being downloaded to server 100 in step 23*l*. Server 100 then downloads the one or more downloadable resources to MS B in step 23*m*.

Since server 100 is involved in the download path of the one or more downloadable resources downloaded by MS B, server 100 is able to facilitate the crediting of the download recommendation to the user of MS A, for example by incrementing an account associated with the appropriate predetermined affiliate, e.g. the user of MS A, or by transmitting a download notification message to a predetermined network address corresponding to a download tracking entity which identifies the predetermined affiliate as the user of MS A.

Figure 24:
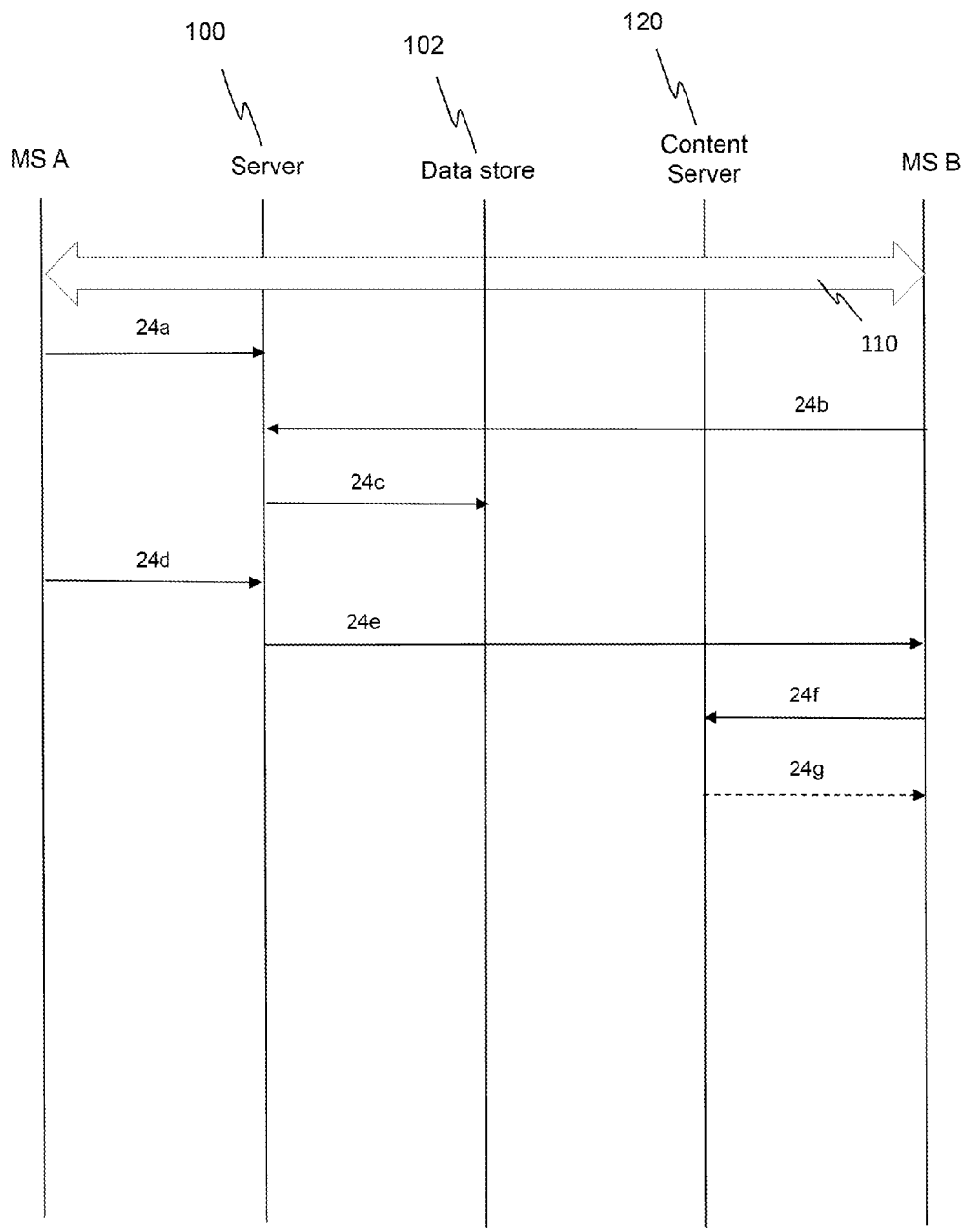
FIG. 24 is a flow diagram depicting operation of embodiments using the system of FIG. 20.

FIG. 24 is a flow diagram depicting operation of embodiments, for example implemented in a system depicted in FIG. 20.

In a first embodiment depicted by FIG. 24, the predetermined affiliate comprises a user of user device MS A.

A voice call is conducted between MS A in PLMN A and MS B in PLMN B, as shown by item 110. Similarly as described above in relation to FIG. 2, application software running on MS A detects that there is a call in progress between MS A and MS B and notifies server 100 of call party details for the call in step 24*a*, and application software running on MS B detects the call in progress between MS B and MS A and notifies server 100 of call party details for the call in step 24*b*.

Server 100 identifies that the notification of step 24*a* from MS A and notification of step 24*b* from MS B have call party details, TDN A and TDN B, in common and establishes a separate communications session, separate from the telephone call, for the communication of data between MS A and MS B. Server 100 updates the records for MS A and MS B in data store 102 to indicate that a call is in progress between MS A and MS B and that a communications session between MS A and MS B, separate to the voice call between MS A and MS B, has been established in step 24*c*.

During the call, the user of MS A decides to recommend one or more downloadable resources to the user of MS B and using appropriate input on MS A transmits an identifier identifying one or more downloadable resources to server 100 in step 24*d*. In conjunction with transmittal of the identifier identifying one or more downloadable resources to server 100, step 24*d* also involves transmittal of an affiliate identifier associated with MS A to server 100. The identifier identifying one or more downloadable resources and/or the affiliate identifier may be transmitted to server 100 via the separate communications session.

Server may update (not shown) data store 102 with the affiliate identifier associated with MS A (not shown) received in step 24*d*.

Upon receipt of the identifier identifying one or more downloadable resources and affiliate identifier at server 100 in step 24*d*, server 100 generates a transmissible identifier based at least in part on the identifier for the one or more downloadable resources received from MS A in step 24*d*. The transmissible identifier is operable to, in response to download of the one or more downloadable resources using the transmissible identifier, associate a predetermined affiliate, e.g. the user of MS A, with the download. Server 100 then enables the download of the one or more downloadable resources to MS B by transmitting the transmissible identifier to MS B in step 24*e*.

When the transmissible identifier is received at MS B, the user of MS B uses the transmissible identifier to locate the one or more downloadable resources recommended by the user of MS A in step 24*f* and download of the one or more downloadable resources to MS B occurs in step 24*g*. Download of the one or more downloadable resources to MS B using the transmissible identifier in step 24*g* results in the user of MS A being associated with the download, thus allowing the user of MS A to be rewarded or otherwise credited for recommending the one or more downloadable resources for download to the user of MS B.

In an alternative embodiment to the first embodiment described above in relation to FIG. 24, instead of MS A transmitting an affiliate identifier in conjunction with an identifier for one or more downloadable resources to server 100 in step 24*d*, step 24*d* can just involve transmittal of an identifier identifying one or more downloadable resources. Server 100 can then allocate an affiliate identifier to MS A itself and generate a transmissible identifier accordingly.

In a second embodiment depicted by FIG. 24, the predetermined identifier identifies a service provider associated with generation of the transmissible identifier, for example the service provider responsible for operation of server 100 and data store 102.

In this second embodiment depicted by FIG. 24, steps 24a to 24c occur in a similar manner to steps 24a to 24c described above in relation to the first embodiment depicted by FIG. 22.

During the call, the user of MS A decides to recommend one or more downloadable resources to the user of MS B and using appropriate input on MS A transmits an identifier identifying one or more downloadable resources to server 100 in step 24d. In this second embodiment, no affiliate identifier is transmitted from MS A to server 100 in conjunction with transmittal of the identifier identifying one or more downloadable resources to server 100 in step 24d.

In this second embodiment, server 100 then generates a transmissible identifier based at least in part on the identifier identifying one or more downloadable resources received from MS A in step 24d. The transmissible identifier is operable to, in response to download of the one or more downloadable resources using the transmissible identifier, associate a predetermined affiliate, e.g. the service provider associated with generation of the transmissible identifier, with the download.

In this second embodiment, the predetermined identifier may comprise a network address for a server operated by the service provider at which the transmissible identifier is generated and generating the transmissible identifier may comprise inserting a network address for the server into the received identifier. The same predetermined identifier may be used by the service provider in relation to calls to/from and separate communications sessions between a plurality of user devices, not just in relation to recommendations originating from MS A and calls between MS A and MS B.

Server 100 enables the download of the one or more downloadable resources to MS B by transmitting the transmissible identifier to MS B in step 24e.

When the transmissible identifier is received at MS B, the user of MS B uses the transmissible identifier to locate the one or more downloadable resources recommended by the user of MS A in step 24f and download of the one or more downloadable resources to MS B occurs in step 24g.

Download of the one or more downloadable resources to MS B using the transmissible identifier in step 24g results in the service provider associated with generation of the transmissible identifier being associated with the download, thus allowing the service provider to be rewarded or otherwise credited for passing the recommendation to download one or more downloadable resources from the user of MS A to the user of MS B.

In some embodiments, when the download from content server 120 occurs, the transmissible identifier indicates to content server 120 that the recommendation came via server 100 and content server 120 can thus identify the service provider associated with generation of the transmissible identifier as the predetermined affiliate associated with the download to MS B. Content server then increments an account associated with the predetermined affiliate in order to keep track of recommendations provided via server 100 which resulted in downloads to other user devices.

In other embodiments, when the download from content server 120 occurs, the transmissible identifier indicates to content server 120 that it should transmit a download notification message to a predetermined network address. The predetermined network address could correspond to a download tracking entity (not shown) responsible for keeping track of downloadable resource download recommendations and resulting downloadable resource downloads for a plurality of content servers. The download tracking entity can thus recognize that the recommendation from the user of MS A to download the one or more downloadable resources that were subsequently downloaded by the user of MS B came via server 100 and can credit the service provider associated with generation of the transmissible identifier accordingly.

In an alternative embodiment to the second embodiment depicted by FIG. 24 described above, instead of steps 24e to 24g being carried out upon the user of MS B choosing to download the one or more downloadable resources recommended by the user of MS A using the transmissible identifier, server 100 can contact content sever 120 itself, carry out the download of the one or more downloadable resources and pass the one or more downloadable resources on to MS B in a similar manner to steps 23j to 23m described above in relation to FIG. 23. In these alternative embodiments, the predetermined affiliate is the service provider, e.g. credit for download of the one or more downloadable resources will go to the service provider.

During a call between two parties, the party devices used for the call may have different operating systems. One device may therefore require that downloadable resources downloaded to the device be in a different format to the downloadable resources recommended by the other party.

For example MS A may run an Android operating system and MS B may run an iPhone operating system. Android and iPhone versions of the app may exist and one version may only be suitable for installation on one of the devices. The Android version of the app may only be available for purchase via one content server, e.g. Android Marketplace™, whereas the iPhone™ version of the app may only be available for purchase via another content server, e.g. iTunes™ App Store. If the user of MS A recommends an Android app to the user of MS B, this can create compatibility problems because the iPhone operating system MS B may not be able to run the recommended app in the Android format correctly.

The above compatibility problem can be tackled by conducting a compatibility check to determine whether the device (say MS B) to which the one or more downloadable resources are being recommended supports a first format (supported by MS A say) in which the one or more downloadable resources are being recommended. If the compatibility check indicates that MS B does not support the first format, then a transmissible identifier is generated such that the transmissible identifier identifies the one or more downloadable resources in a second format, different to the first format, where MS B does support the second format.

Compatibility data indicating supported file formats of a plurality of user devices may be stored in a date store such as data store 102 accessible by server 100, and the compatibility check may be conducted at server 100.

The compatibility check may comprises transmitting a compatibility query to MS B, and receiving a response indicating whether MS B supports the first format or not. Conducting the compatibility check may comprise performing a lookup in a file format database (not shown) responsible for providing identifiers for downloadable resources across a plurality of formats.

In embodiments described above in relation to FIGS. 20 to 24, server 100 generates a transmissible identifier based at least in part on an identifier for one or more downloadable resources it receives from MS A, where the transmissible identifier is operable to, in response to download of the one or more downloadable resources using the transmissible identifier, associate a predetermined affiliate with the download. In alternative embodiments, MS A may transmit an identifier identifying one or more downloadable resources to server 100, where the received identifier is operable to, in response to download of one or more downloadable resources using the received identifier, associate a predetermined affiliate with download of the one or more downloadable resources. In such alternative embodiments, MS A may generate the identifier for the one or more downloadable resources itself without requiring any modification of the identifier by server 100. Server 100 enables download of the one or more downloadable resources to MS B by transmitting the identifier received from MS A on to MS B. In such alternative embodiments, the predetermined affiliate may comprise the user of MS A.

The above embodiments are to be understood as illustrative examples. Further embodiments are envisaged.

The above described embodiments primarily relate to telephony devices having associated identities in the form of telephone dialing numbers. In other embodiments, one or more, or all of the identities could be non-telephone-dialing-numbers, for example usernames, email addresses etc. Where non-telephone-dialing-number identities are employed, mappings between non-telephone-dialing-number identities and telephone dialing number identities may be stored in data store 102 and used by server 100 for converting from non-telephone-dialing-number identities to telephone dialing numbers after receipt of the call party details The personal computer PC A described above could alternatively be another device or combination of devices with corresponding data processing, display and data input capabilities, for example a television, a smart television, a general purpose desktop computer terminal, a general purpose laptop computer terminal, a general purpose tablet computer terminal, an in-car computing and communications system a satellite navigation system, games console, or any combination thereof.

In embodiments described above, telephone calls to/from mobile stations and POTS phones are detected either by application software running on the mobile stations or by a telephony apparatus configured accordingly. In alternative embodiments, during a voice call, a party to the call uses a computing terminal to enter in call party details (for example the calling and called party telephone dialing numbers) for the call via a web server interface. The web server interface passes the call party details to server 100 which can then establish a communications session, separate to the voice call, on the basis of the calling and called party telephone dialing numbers received from the web server interface.

The logical coupling between user devices for a user may be temporary or more permanent. If for example a user has a POTS phone and a PC as their user devices in their home, then these devices will tend to be used by the user on a fairly permanent basis, so the logical coupling would tend to be more permanent. If for example a user has a mobile phone and a satellite navigation system in their car, then the logical coupling between the two devices may only be valid when the user is in or near their car, so the logical coupling would only be maintained temporarily when the two devices are within close enough proximity of each other.

The logical coupling between a user's devices can be activated (or otherwise triggered) by a variety of different processes. One example could involve communication between a smartphone and a satellite navigation system via a short wave radio interface (such as a Bluetooth™ interface) in order to couple the two devices together locally, along with subsequent registration of details of such with server 100. Another example could be registration of device details via a website. A further example might involve registration by a service engineer when installing a telephone and set-top box combination. Alternatively, registration could be carried out over the telephone verbally to an administrative operator, or via an Interactive Voice Response (IVR) system.

The above embodiments describe telephone calls and establishment of communications sessions for user devices of two parties. All embodiments can be applied to user devices of multiple parties numbering more than two. When the multiple parties are conducting a multi-leg teleconference, a communications session can be created between all of their user devices, allowing communication of data, not just between two user devices, but between many different combinations of user devices, i.e. multi-branch data communication.

The connections between server 100 and the user devices are described above as being HTTP or HTTPS connections. In alternative embodiments, the connections could be peer-to-peer connections such that data is communicated between the user devices through a number of peer-to-peer nodes. Creating the peer-to-peer connections may involve use of processes for traversing firewalls, for example using protocols such as the Simple Traversal of User Datagram Protocol (UDP) Through Network Address Translators (NATs) (STUN) protocol.

Further alternatively, the connections could initially be created as HTTP or HTTPS connections between server 100 and the user devices, but then could be migrated to peer-to-peer connections according to network topography and/or current network load.

Embodiments described above involve communication of different types of data during a communication session, for example software component identifiers, software applications, feature identifiers, authorization requests, authorization indications, geographical location data, etc. Any of these different types of data may be communicated between the various combinations of devices in the above described embodiments, including mobile station to mobile station and mobile station to PC, both with or without use of telephony apparatus for call detection.

Embodiments described above allow a single predetermined affiliate such as a user of a device or a service provider to be associated with download of one or more files by a user of another device. In alternative embodiments, both a user of a device and a service provider can be associated with download of one or more file by a user of another device.

In the above-described embodiments, both call parties transmit, either from the telephony device, or an associated device, call party identifiers for each party to the server 100 in the process of setting up the separate data communications session. These call party identifiers are, in the embodiments described, both telephony dialing numbers (TDNs). In alternative embodiments, one party or both parties may be identified by another form of call party identifier, using for example one or more lookup mechanisms which map a telephony dialing number to a different unique identifier and/or vice-versa (examples of such alternatives are described in further detail below.) However, such lookup mechanisms may increase latency and may introduce unexpected errors (e.g. if a lookup database such as an address book is not kept up to date.) Hence, whilst it is not indeed necessary for either party to transmit a telephony dialing number of either party (since either party may be identified by other mechanisms), it is preferred that at least one of the devices includes the telephony dialing number of the other party. Indeed, whilst it is again not necessary, it is preferred that both parties transmit the telephony dialing number of the other party, if available, to the server 100, during the session setup. Furthermore, in order at least to reduce latency at the server, and/or to reduce the need to maintain a separate store of identities and/or to reduce the need to implement a registration mechanism, it is preferred that both parties transmit both their own telephony dialing number and the telephony dialing number of the other party, if available, to the server 100, during the session setup. If a call party is identifiable using an additional identifier, such as an extension number or a conference call ID, the additional identifier may be transmitted in association with both of the telephony dialing numbers, if available, by one or each party to the call.

As mentioned above, in alternative embodiments, one, or each, of the call parties may transmit, either from the telephony device, or an associated device, a unique identifier in the form other than that of a telephony dialing number which is nonetheless recognizable by the server 100. A user device which interacts with the server may thus transmit the unique identifier to identify one party, or both parties, as a party to the call, instead of a telephony dialing number. For example, the server 100 may have access to a data store which includes a set of unique identifiers for all subscribers registered to receive the service provided by the server 100, along with a corresponding telephony dialing number for a telephony device associated with each respective unique identifier. Such unique identifiers may be allocated by the server 100 during an initial registration procedure, and notified to, and stored by, an application on the user device which interacts with the server 100 during the registration procedure. Other globally unique identifiers, such as email addresses, Facebook™ IDs, etc. may be used alternatively, or in addition, to such allocated unique identifiers.

In embodiments, at least one of the two call parties may use a Voice-over-Internet-Protocol (VoIP) enabled device or other device employing the Session Initiation Protocol (SIP). One, or each, party may be identified in the call setup procedures by means of a unique SIP user identifier which may include a telephone dialing number as a user identifier or a user identifier other than a telephony dialing number, for example a SIP identifier in which the form of username@hostname. Thus, a SIP user identifier can be transmitted to the server 100 as a call party identifier identifying at least one, or each, participant in the call.

In embodiments, a call party identifier may take the form of an Internet Protocol (IP) address, which may be either a static or dynamically allocated IP address. This may for example be the IP address which a user device transmits to the server 100 in a client-server connection setup request, for example an HTTP setup request, when establishing a leg of the communications session. This may uniquely identify the call party associated with the device making the request. If for example, a given party sends the telephony dialing number of only the other party to the server 100 in the session setup procedure, then that given party can nevertheless be identified as a party to the call using the IP address of that given party's device used in establishing the session leg. The supplied IP address may then be used to send data to that given party's device throughout the ensuing communications session, even if the IP address is only temporarily allocated to the user device as a dynamic IP address. Hence, a static or dynamic IP address may be used, in some embodiments, to identify a call party and may be one of the call party identifiers which forms part of the call party details transmitted to the server 100, e.g. in a connection setup request during session establishment.

In embodiments, a call party identifier may take the form of a session identifier, or other unique identifier, generated by the server 100 and received from the server 100 by a user device in a push notification message. Such a push notification message may be sent from the server in response to the server receiving call party details from the other party to the call, in a first communication session leg. The push notification message is configured, on receipt, to trigger the user device to set up a second communication session leg with the server 100. The user device may be configured to include the identifier received in the push notification as a call party identifier in a client-server connection setup request, for example an HTTP setup request, when establishing the communications session leg in response to the push notification message. This may uniquely identify the call party associated with the device making the request, since such identifier may be mapped to the telephony dialing number, or other call party identifier, by the server 100. Hence, an identifier received in a push notification message may be used, in some embodiments, to identify a call party and may be one of the call party identifiers which forms part of the call party details transmitted to the server 100, e.g. in a connection setup request during session establishment.

A unique identifier in any of the various forms described above, in a form other than that of a telephony dialing number, may be used to identify a given party to the call, in call party details transmitted by a user device associated with that given party. A unique identifier in any of the various forms described, in a form other than that of a telephony dialing number, may in addition, or in the alternative, be used to identify another party to the call, in call party details transmitted by that given party. The server 100 may supply the unique identifiers of other parties, using e.g. a synchronization process for populating an address book locally stored on the user device with such identifiers. Alternatively, such unique identifiers of other parties may already be stored by, or manually added by a user of the device, in the local address book. Further alternatively, the unique identifiers may be stored in a global address book stored on a remote device. At least one of the two parties may have a user device which is configured to look up, from a local data store (e.g. a local address book) or a remote data store (e.g. a global address book), a correspondence between the other party's telephone dialing number, or other received unique identifier, and a different unique identifier. The different unique identifier may then be used instead to identify the other party to the call in the call party details transmitted by at least one side of the call to the server 100.

In the above, various forms of alternative call party identifiers are described. Whatever form the supplied unique identifier takes, the server 100 may have a corresponding database and lookup mechanism to map a supplied unique identifier to a different call party identifier, such as a telephony dialing number, whereby to match both session legs together as relating to a particular current telephone call, using the information supplied in each respective one of the session legs. The server can then bridge the two session legs together, or otherwise associate the two session legs, to create a separate communications session between the participants in a currently ongoing call.

In the above described embodiments, whilst a different form of call party identifier may be used in some cases, in a generally accessible telephony system at least one of the two parties may have no access to identifying details other than the telephony dialing number of the other call party when the call is established. Hence, it is preferable that the system is configured such that at least one of the two parties may transmit the call party identifier of the other party to the server 100 in the form of a telephony dialing number, and that the server 100 is able to process one or more call party details in such a form in order to establish the separate communications session.

In alternative embodiments, rather than both call parties transmitting both calling party and called party identifiers to identify the parties to a call, at least one of the parties may transmit only one of the two call party identifiers to the server 100. This may be done according to a predetermined convention, e.g. a convention which determines that the calling party should always transmit both identifiers but the called party need only transmit one identifier (or vice-versa). Again, the server 100 is nevertheless able to match both session legs together as relating to a particular current telephone call, using the information supplied in both of the session legs. In this case, it is sufficient that at least one common call participant, namely that participant which is determined by convention to be identified by each party to the call, has been identified in each session leg.

In some circumstances, the telephony dialing number, or other call party identifier, of the other party may not be received at all during the call setup procedures. For example, the other party may use a number withholding service. Hence, an identifier for the other party may not be available to the user device. In this case, the user device may be able, during the setup of the separate communications session, to identify only its associated call party (and not the other call party) to the server 100 as a party to the call. However, providing both sides of the call do not use a number withholding service, the other party's device may be able identify both parties to the call, and may transmit call party details identifying both call parties to the server 100 during session establishment. Again, the server 100 is nevertheless able to match both session legs together as relating to a particular current telephone call, using the information supplied in both of the session legs. Again, in this case, it is sufficient that at least one common call participant, namely the participant not using a number withholding service, has been identified in both session legs.

In the above-described embodiments the mobile stations MS A, MS B communicate via a PLMN. Such a PLMN may be any of a variety of different cellular communications network types, including a 2G network such as a Global System for Mobile communications (GSM) network, a 3G network, such as a Universal Mobile Telecommunications System (UMTS) network or a 4G network such as a Long Term Evolution (LTE or LTE Advanced) network. Whilst the call setup and call data flow may be conducted via the PLMN, the communications relating to the separate data communications session, e.g. communications with the server 100, may be conducted via a different radio access network (RAN), such as a wireless local area network (WLAN) based on the IEEE 802.11 standards.

In the above-described embodiments, the server 100 is described as a single computing device located in a single network location. However, it should be understood that the server may consist of a distributed set of computing devices or applications, either co-located in a single network location, or dispersed in different network locations.

In accordance with embodiments, there is a method for the communication of data with respect to at least two different user devices in a data communications network, the method comprising the steps of:

receiving call party details of a telephone call, the telephone call involving at least a first telephony user device and a second telephony user device, the call party details including one or more of a first identity associated with the first telephony user device and a second identity associated with the second telephony user device;

establishing, on the basis of the received call party details, a communications session, separate from the telephone call, for the communication of data to and/or from the at least two different user devices, the communication session being established in response to the telephone call being established;

receiving, on the basis of user input at one of the at least two different user devices, an identifier identifying one or more downloadable resources;

generating a transmissible identifier based at least in part on the received identifier, the transmissible identifier being operable to initiate the download of the one or more downloadable resources using the transmissible identifier, and to associate a predetermined identity with the download; and enabling the download of the one or more downloadable resources to another of the at least two different user devices using the transmissible identifier.

Hence, embodiments allow a user to recommend a downloadable resource, such as a downloadable file, to a user they are interacting with, for example via a telephone call to which they are a party, and/or via another two-party or multi-party communications mechanism, such as a messaging service. Embodiments provide a download tracking scheme such that download of the recommended downloadable resource triggers crediting of the download to a predetermined affiliate.

In embodiments, generating the transmissible identifier comprises inserting the predetermined identifier into the transmissible identifier. Hence, the predetermined identifier can be used to identify a predetermined affiliate to which credit for download of a recommended downloadable resource should be attributed.

In one embodiment, the enabling comprises transmitting the transmissible identifier to the other of the at least two different user devices whereby the other of the at least two different user devices may download the one or more downloadable resources. In another embodiment, the enabling comprises downloading the one or more downloadable resources using the transmissible identifier and transmitting the one or more downloaded downloadable resources to the other of the at least two different user devices. Hence, embodiments allow tracking of recommended downloadable resource downloads using a variety of different download mechanisms Some arrangements involve the predetermined identifier identifying a user of the one of the at least two different user devices, whereas other arrangements involve the predetermined affiliate identifying a service provider associated with generation of the transmissible identifier. Hence, embodiments support different ways to determine which affiliate is credited with download of one or more downloadable resources.

Generating the transmissible identifier may comprise inserting a network address for a server into the transmissible identifier. Involving the server in the download path of the one or more recommended downloadable resources allows the server to track download of the downloadable resources and hence credit the appropriate affiliate.

In some embodiments, associating the predetermined identifier with the download of the one or more downloadable resources using the transmissible identifier comprises incrementing an account associated with the predetermined affiliate. In other embodiments, associating the predetermined affiliate with the download of the one or more downloadable resources using the transmissible identifier comprises initiating transmittal of a download notification message to a predetermined network address in the network. Hence, embodiments provide different methods for tracking downloadable resource downloads and crediting an appropriate affiliate.

The received identifier and/or the transmissible identifier may comprise a network address, such as a Uniform Resource Locator (URL), from which the one or more downloadable resources can be downloaded. Hence, embodiments allow remote download of the one or more recommended downloadable resources.

Embodiments support recommendations for download of many different types of downloadable resources, for example software applications, software components such as plug-ins, audio files, image files, and video files.

In embodiments, the received identifier identifies the one or more downloadable resources in a first format, the method comprising conducting a compatibility check to determine whether the other of the at least two different user devices supports the first format; and in response to the compatibility check indicating that the other of the at least two different user devices does not support the first format, generating the transmissible identifier such that the transmissible identifier identifies the one or more downloadable resources in a second format, different to the first format. Hence, embodiments can accommodate downloadable resource recommendations even when the format of the recommended downloadable resource(s) is not supported by the device at which the downloadable resource(s) are to be downloaded. Embodiments can thus be implemented for different user devices having a variety of different operating systems and support for different file formats.

In one arrangement, the method comprises storing compatibility data indicating supported file formats of a plurality of user devices in a data store accessible by a server, and conducting the compatibility check at the server. Hence, a record can be kept of file formats supported by various user devices and consulted in order to ensure that downloadable resources recommended for download are in an appropriate format for the device at which the downloadable resource(s) are to be downloaded.

In another arrangement, the compatibility check comprises transmitting a compatibility query to the other of the at least two different user devices, and receiving a response indicating whether the other of the at least two different user devices supports the first format. Hence, a device at which the downloadable resource(s) are to be downloaded can be consulted in order to ensure downloadable resources recommended for download by the device are in an appropriate format.

In other arrangements, conducting the compatibility check comprises performing a lookup in a file format database in the network responsible for providing identifiers for downloadable resources across a plurality of formats. Hence, a centralized database such as an application matching directory may be consulted to ensure that downloadable resources are recommended in an appropriate format for download.

In some embodiments, the predetermined identifier is received from the one of the at least two different user devices. A user may register an affiliate identifier associated via their user device, for example prior to the establishment of the session and/or via a web-server interface.

Some embodiments involve the predetermined identifier being received from the one of the at least two different user devices via the session and some embodiments involve the predetermined identifier being received prior to the establishment of the session. Where the parties communicate in-call, embodiments support both in-call and pre-call registration of affiliate identifiers.

In embodiments, establishing the session comprises receiving a client-server connection request from, and establishing a client-server connection with, the other of the at least two different user devices, and the identifier is received via the session. In one embodiment, the client-server connection request is transmitted in response to a telephone call being established. In another embodiment, the client-server connection request is transmitted in response to a notification received during a telephone call, after the telephone call is established.

In accordance with embodiments, there is a method for communication of data with respect to at least two different user devices in a data communications network, the method comprising the steps of:

receiving call party details of a telephone call, the telephone call involving at least a first telephony user device and a second telephony user device, the call party details including one or more of a first identity associated with the first telephony user device and a second identity associated with the second telephony user device;

establishing, on the basis of the received call party details, a communications session, separate from the telephone call, for the communication of data to and/or from the at least two different user devices, the communication session being established in response to the telephone call being established;

generating, from an identifier specified at one of the at least two different user devices, a transmissible identifier identifying one or more downloadable resources, the transmissible identifier being operable to, in response to download of the one or more downloadable resources using the transmissible identifier, associate a predetermined identifier with the download; and enabling the download of the one or more downloadable resources to another of the at least two different user devices using the transmissible identifier.

Hence, a user device may generate an identifier for one or more downloadable resources which is operable to associate a predetermined identifier with the download, upon download of the one or more downloadable resources using the identifier.

In accordance with embodiments, there is computer software adapted to perform a method for communication of data with respect to at least two different user devices in a data communications network, the method comprising:

receiving call party details of a telephone call, the telephone call involving at least a first telephony user device and a second telephony user device, the call party details including one or more of a first identity associated with the first telephony user device and a second identity associated with the second telephony user device;

establishing, on the basis of the received call party details, a communications session, separate from the telephone call, for the communication of data to and/or from the at least two different user devices, the communication session being established in response to the telephone call being established;

generating, from an identifier specified at one of the at least two different user devices, a transmissible identifier identifying one or more downloadable resources, the transmissible identifier being operable to, in response to download of the one or more downloadable resources using the transmissible identifier, associate a predetermined identifier with the download; and enabling the download of the one or more downloadable resources to another of the at least two different user devices using the transmissible identifier.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method for the communication of data with respect to at least two different user devices in a data communications network, the method comprising the steps of:
receiving call party details of a telephone call, the telephone call involving at least a first telephony user device and a second telephony user device, the call party details including one or more of a first identity associated with the first telephony user device and a second identity associated with the second telephony user device;
establishing, on the basis of the received call party details, a communications session, separate from the telephone call, the communication session being established in response to the telephone call being established, wherein the communication session is for the communication of data to one or more of the at least two different user devices, from one or more of the at least two different devices, or to and from one or more of the at least two different user devices;
receiving, on the basis of user input at one of the at least two different user devices, an identifier identifying one or more downloadable resources;
generating a transmissible identifier based at least in part on the received identifier, the transmissible identifier being operable to initiate the download of the one or more downloadable resources using the transmissible identifier, and to associate a predetermined identity with the download; and
enabling the download of the one or more downloadable resources to another of the at least two different user devices using the transmissible identifier.

2. A method according to claim 1, wherein generating the transmissible identifier comprises inserting an affiliate identifier into the transmissible identifier.

3. A method according to claim 1, wherein the enabling comprises transmitting the transmissible identifier to the another of the at least two different user devices whereby the another of the at least two different user devices may download the one or more downloadable resources.

4. A method according to claim 1, wherein the enabling comprises downloading the one or more downloadable resources using the transmissible identifier and transmitting the one or more downloaded downloadable resources to the another of the at least two different user devices.

5. A method according to claim 1, wherein the predetermined identity comprises an identity for a user of the one of the at least two different user devices.

6. A method according to claim 1, wherein the predetermined identifier is stored on the one of the at least two different user devices.

7. A method according to claim 1, wherein the predetermined identifier comprises an identifier for a service provider associated with the generation of the transmissible identifier.

8. A method according to claim 7, wherein the predetermined identifier is inserted by the service provider when the transmissible identifier is generated.

9. A method according to claim 1, wherein generating the transmissible identifier comprises inserting a network address for the downloadable resource into the transmissible identifier.

10. A method according to claim 1, comprising associating the predetermined identifier with the download of the one or more downloadable resources using the transmissible identifier by incrementing an account associated with the predetermined identifier.

11. A method according to claim 1, comprising associating the predetermined identifier with the download of the one or more downloadable resources using the transmissible identifier by initiating transmittal of a download notification message to a predetermined network address in the network.

12. A method according to claim 1, wherein generating the transmissible identifier comprises inserting a network address for a server into the transmissible identifier.

13. A method according to claim 1, wherein at least one of the received identifier and the transmissible identifier comprise a network address from which the one or more downloadable resources can be downloaded.

14. A method according to claim 1, wherein the received identifier identifies the one or more downloadable resources in a first format, the method comprising:
conducting a compatibility check to determine whether the another of the at least two different user devices supports the first format; and
in response to the compatibility check indicating that the another of the at least two different user devices does not support the first format, generating the transmissible identifier such that the transmissible identifier identifies the one or more downloadable resources in a second format, different to the first format.

15. A method according to claim 14, wherein the method comprises at least one of:
storing compatibility data indicating supported file formats of a plurality of user devices in a data store accessible by a server, and conducting the compatibility check at the server; or
conducting the compatibility check, wherein the compatibility check comprises transmitting a compatibility query to the another of the at least two different user devices, and receiving a response indicating whether the another of the at least two different user devices supports the first format; and
conducting the compatibility check, wherein the compatibility check comprises performing a lookup in a file format database in the network responsible for providing identifiers for downloadable resources across a plurality of formats.

16. A method according to claim 5, comprising receiving the predetermined identifier from the one of the at least two different user devices, wherein:
the predetermined identifier is received from the one of the at least two different user devices prior to the establishment of the session; or
the predetermined identifier is received from the one of the at least two different user devices via the session.

17. A method according to claim 1, further comprising receiving the predetermined identifier, prior to the establishment of the session, via a web-server interface.

18. A method according to claim 1, wherein establishing the session comprises receiving a client-server connection request from, and establishing a client-server connection with, the another of the at least two different user devices, and the identifier is received via the session.

19. A method for communication of data with respect to at least two different user devices in a data communications network, the method comprising the steps of:
receiving call party details of a telephone call, the telephone call involving at least a first telephony user device and a second telephony user device, the call party details including one or more of a first identity associated with the first telephony user device and a second identity associated with the second telephony user device;

establishing, on the basis of the received call party details, a communications session, separate from the telephone call, the communication session being established in response to the telephone call being established, wherein the communication session is for the communication of data to one or more of the at least two different user devices, from one or more of the at least two different user devices, or to and from one or more of the at least two difference user devices;

generating, from an identifier specified at one of the at least two different user devices, a transmissible identifier identifying one or more downloadable resources, the transmissible identifier being operable to, in response to download of the one or more downloadable resources using the transmissible identifier, associate a predetermined identifier with the download; and enabling the download of the one or more downloadable resources to another of the at least two different user devices using the transmissible identifier.

20. A method according to claim 19, wherein the predetermined identifier identifies a user of the one of the at least two different user devices.

21. Server apparatus comprising a processing system configured to perform the method of claim 1.

22. A telephony user device capable of establishing a communications session for communication of data with respect to at least one other user device in a data communications network, the telephony user device comprising a processing system configured to:

receive call party details of a telephone call, the telephone call involving at least the telephony user device and another telephony user device, the call party details including one or more of a first identity associated with the telephony user device and a second identity associated with the another telephony user device;

establish, on the basis of the received call party details, a communications session, separate from the telephone call, the communication session being established in response to the telephone call being established, wherein the communication session is for the communication of data to one or more of the at least two different user devices, from one or more of the at least two different user devices, or to and from one or more of the at least two different user devices;

generate, from an identifier specified at the telephony user device, a transmissible identifier identifying one or more downloadable resources, the transmissible identifier being operable to, in response to download of the one or more downloadable resources using the transmissible identifier, associate a predetermined identifier with the download; and transmit the transmissible identifier via the communications session.

23. A computer program product comprising a non-transitory computer-readable storage medium having computer readable instructions stored thereon, the computer readable instructions being executable by a computerized device to cause the computerized device to perform a method according to one of claims 1 or 20.

* * * * *